US009807327B2

(12) United States Patent
Tate

(10) Patent No.: US 9,807,327 B2
(45) Date of Patent: Oct. 31, 2017

(54) SOLID-STATE IMAGE DEVICE, METHOD OF DRIVING SOLID-STATE IMAGING DEVICE, AND ELECTRONIC SYSTEM WITH AD CONVERTER AND BIAS CURRENT CONTROL

(71) Applicant: Sony Corporation, Tokyo (JP)

(72) Inventor: Tomoyasu Tate, Kanagawa (JP)

(73) Assignee: Sony Corporation, Tokyo (JP)

(*) Notice: Subject to any disclaimer, the term of this patent is extended or adjusted under 35 U.S.C. 154(b) by 154 days.

(21) Appl. No.: 14/791,951

(22) Filed: Jul. 6, 2015

(65) Prior Publication Data
US 2016/0037115 A1 Feb. 4, 2016

Related U.S. Application Data

(63) Continuation of application No. 13/860,936, filed on Apr. 11, 2013, now Pat. No. 9,094,627.

(30) Foreign Application Priority Data

May 17, 2012 (JP) ................................ 2012-113276

(51) Int. Cl.
*H04N 5/374* (2011.01)
*H04N 5/369* (2011.01)
*H04N 5/3745* (2011.01)

(52) U.S. Cl.
CPC ......... *H04N 5/3741* (2013.01); *H04N 5/3698* (2013.01); *H04N 5/37455* (2013.01); *H04N 5/37457* (2013.01)

(58) Field of Classification Search
CPC .. H04N 5/3698; H04N 5/37457; H04N 5/372; H04N 5/37206; H04N 5/3743
See application file for complete search history.

(56) References Cited

U.S. PATENT DOCUMENTS 7,102,202 B2  9/2006 Kobayashi et al.
7,876,294 B2  1/2011 Sasaki et al.
(Continued)

FOREIGN PATENT DOCUMENTS

JP  2003-271095  9/2003
JP  2005-258326  9/2005
(Continued)

OTHER PUBLICATIONS

Japanese Office Action dated May 6, 2010 for corresponding Japanese Application No. 2008-210509.

*Primary Examiner* — Francis M Legasse, Jr.
(74) *Attorney, Agent, or Firm* — Michael Best & Friedrich LLP

(57) ABSTRACT

A solid-state imaging device includes: a pixel array section in which a plurality of pixels including an amplification transistor configured to amplify a signal based on a photoelectric charge in accordance with an amount of received light are disposed; through vertical signal lines of the pixel array section, a bias-current control section configured to turn on or off a bias current supplied to the amplification transistor for each of the vertical signal lines; and a drive control section configured to control the bias-current control section so as to turn on the bias current of the vertical signal line through which a pixel signal is read, and to turn off the bias current of the vertical signal line through which a pixel signal is not read.

12 Claims, 14 Drawing Sheets

(56) References Cited

U.S. PATENT DOCUMENTS

| | | | |
|---|---|---|---|
| 2004/0046164 A1 | 3/2004 | Kobayashi et al. | |
| 2005/0206590 A1 | 9/2005 | Sasaki et al. | |
| 2006/0267884 A1 | 11/2006 | Takahashi et al. | |
| 2008/0030436 A1 | 2/2008 | Iida et al. | |
| 2008/0150843 A1 | 6/2008 | Yamamoto et al. | |
| 2008/0259195 A1 | 10/2008 | Yoshida et al. | |
| 2009/0251493 A1* | 10/2009 | Uchino et al. | |
| 2011/0193983 A1* | 8/2011 | Uchida | H04N 5/335 348/222.1 |
| 2011/0234871 A1* | 9/2011 | Taruki | H04N 5/3559 348/297 |

FOREIGN PATENT DOCUMENTS

| | | |
|---|---|---|
| JP | 2006-330223 | 12/2006 |
| JP | 2007-133282 | 5/2007 |
| JP | 2007-255856 | 10/2007 |
| JP | 2008-033193 | 2/2008 |
| WO | 2007/055376 | 5/2007 |

* cited by examiner

SOLID-STATE IMAGE DEVICE, METHOD OF DRIVING SOLID-STATE IMAGING DEVICE, AND ELECTRONIC SYSTEM WITH AD CONVERTER AND BIAS CURRENT CONTROL

CROSS REFERENCES TO RELATED APPLICATIONS

This is a Continuation Application of the patent application Ser. No. 13/860,936, filed Apr. 11, 2013, which claims priority from Japanese Patent Application No.: 2012-113276, filed May 17, 2012, the entire contents of which being incorporated herein by reference.

BACKGROUND

The present technique relates to a solid-state imaging device, a method of driving the solid-state imaging device, and an electronic system. In particular, the present technique relates to a solid-state imaging device, a method of driving the solid-state imaging device, and an electronic system, which has enabled reduction in power consumption.

To date, in CMOS image sensors, a column AD method, in which an ADC (AD converter) is disposed for each pixel column, and the ADCs are operated in parallel so that reading speed is increased, has been familiar. Also, in a CMOS image sensor of the column AD method, a technique of sharing ADCs by a plurality of pixel columns has been proposed (for example, refer to Japanese Unexamined Patent Application Publication No. 2010-93653).

On the other hand, in recent years, mobile electronic systems provided with a camera, such as a mobile phone, a smart phone, and so on, have become widespread.

SUMMARY

In such a mobile electronic system, a duration time of a battery is requested to be extended as long as possible. Accordingly, it is desirable to reduce power consumption of a solid-state imaging device, such as a CMOS image sensor and so on that are used in a camera.

Thus, the present technique makes it possible to reduce power consumption of a solid-state imaging device.

According to an embodiment of the present technique, there is provided a solid-state imaging device including: a pixel array section in which a plurality of pixels including an amplification transistor configured to amplify a signal based on a photoelectric charge in accordance with an amount of received light are disposed; through vertical signal lines of the pixel array section, a bias-current control section configured to turn on or off a bias current supplied to the amplification transistor for each of the vertical signal lines; and a drive control section configured to control the bias-current control section so as to turn on the bias current of the vertical signal line through which a pixel signal is read, and to turn off the bias current of the vertical signal line through which a pixel signal is not read.

The drive control section may be configured to further control switching modes between a first mode in which pixel columns whose pixel signals are read are changed in time series, and a second mode in which pixel signals of all the pixel columns are read and then the pixel signals of the plurality of pixel columns are smoothed.

In the first mode, the drive control section may be configured to perform control so as to turn on the bias current of the vertical signal line through which a pixel signal is read, and to turn off the bias current of the vertical signal line through which a pixel signal is not read.

The solid-state imaging device may further include an AD converter disposed in every two pixel columns or more of the pixel array section, wherein if a number of the AD converters to be used is different between in the first mode and in the second mode, the drive control section is configured to perform control to stop operation of the AD converter not to be used in a mode of a smaller number of the AD converters to be used.

According to another embodiment of the present technique, there is provided a method of driving a solid-state imaging device including a pixel array section in which a plurality of pixels including an amplification transistor configured to amplify a signal based on a photoelectric charge in accordance with an amount of received light are disposed, the method including: out of bias currents supplied to the amplification transistor through vertical signal lines of the pixel array section, turning on or off the bias current for each of the vertical signal lines; and controlling the bias-current control section so as to turn on the bias current of the vertical signal line through which a pixel signal is read, and to turn off the bias current of the vertical signal line through which a pixel signal is not read.

According to another embodiment of the present technique, there is provided an electronic system including: a solid-state imaging device including a pixel array section in which a plurality of pixels including an amplification transistor configured to amplify a signal based on a photoelectric charge in accordance with an amount of received light are disposed, through vertical signal lines of the pixel array section, a bias-current control section configured to turn on or off a bias current supplied to the amplification transistor for each of the vertical signal lines, and a drive control section configured to control the bias-current control section so as to turn on the bias current of the vertical signal line through which a pixel signal is read, and to turn off the bias current of the vertical signal line through which a pixel signal is not read; and a signal processing section configured to perform signal processing on the pixel signals output from the pixels.

In an embodiment of the present technique, out of bias currents supplied to the amplification transistor through vertical signal lines of the pixel array section, the bias current of the vertical signal line through which a pixel signal is read is turned on, and to the bias current of the vertical signal line through which a pixel signal is not read is turned off.

By an embodiment of the present technique, it is possible to reduce power consumption of a solid-state imaging device.

DETAILED DESCRIPTION OF EMBODIMENTS

In the following, descriptions will be given of modes for carrying out the present technique (hereinafter referred to as embodiments). In this regard, the descriptions will be given in the following order.

1. Example of solid-state imaging device to be compared with the present technique
2. Example of solid-state imaging device to which the present technique is applied
3. Variations
4. Electronic systems (imaging apparatuses)
1. Example of Solid-State Imaging Device to be Compared with the Present Technique First, with reference to FIG. 1 to FIG. 7, a description will be given of an example of a solid-state imaging apparatus to be compared with a solid-state imaging device to which the present technique is applied.

1.1 Basic System Configuration

Figure 1:
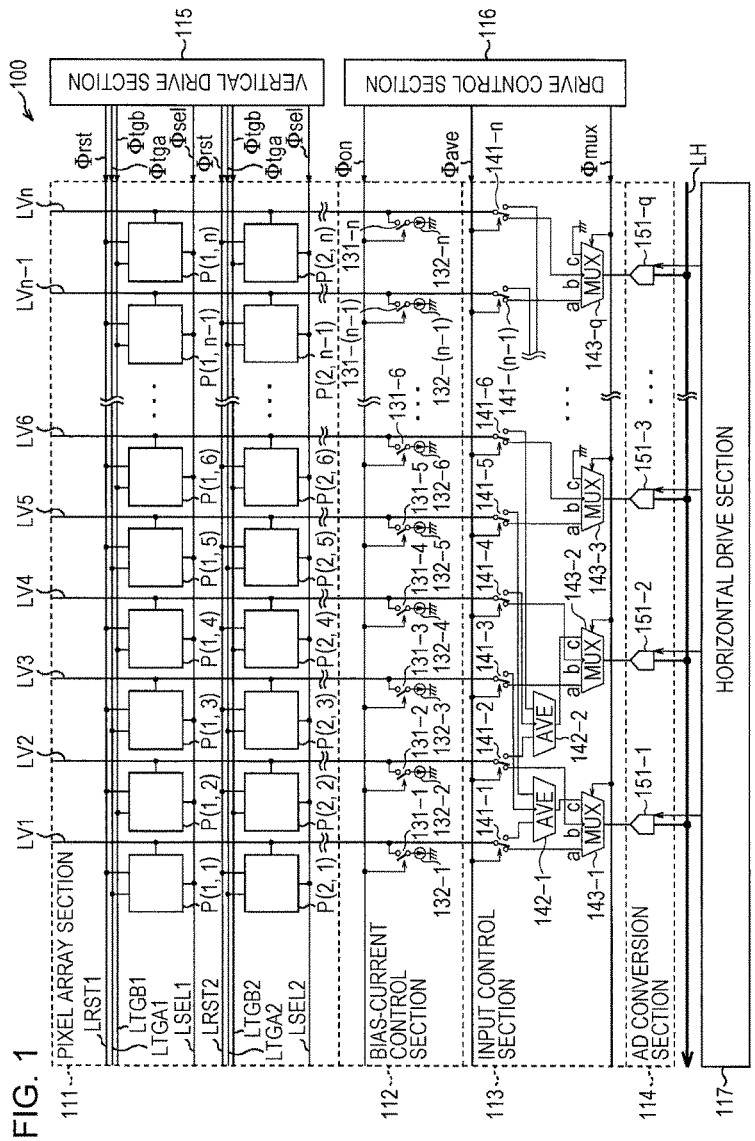
FIG. 1 is a schematic diagram of a basic system configuration of a solid-state imaging device to be compared with a solid-state imaging device to which the present technique is applied.

FIG. 1 is a schematic diagram of a basic system configuration of a solid-state imaging device, for example, a CMOS image sensor, which is a kind of X-Y address type solid-state imaging device, to be compared with a solid-state imaging device to which the present technique is applied. Here, a CMOS image sensor is an image sensor produced by applying a CMOS process or by partially using the CMOS process.

The CMOS image sensor 100 includes a pixel array section 111 formed on a semiconductor substrate (chip) not illustrated in FIG. 1, and a peripheral circuit section integrated on the same semiconductor substrate as that of the pixel array section 111. The peripheral circuit section includes, for example, a bias-current control section 112, an input control section 113, an AD conversion section 114, a vertical drive section 115, a drive control section 116, and a horizontal drive section 117.

The pixel array section 111 has a configuration in which unit pixels P(1, 1) to P(m, n) including a photoelectric conversion section that generates a photoelectric charge in accordance with the amount of received light are arranged in a row direction and a column direction, that is to say, disposed in a two-dimensional m×n matrix. Here, the row direction denotes a disposition direction of pixels in the pixel row (that is to say, in a horizontal direction), and the column direction denotes a disposition direction of pixels in the pixel column (that is to say, in a vertical direction).

Also, in the pixel array section 111, the unit pixels P(1, 1) to P(m, n) are arranged in accordance with the Bayer arrangement. Specifically, for example, a unit pixel P(2i−1, 2j−1)(i and j are natural numbers) is used for detecting a R (Red) component, a unit pixel P(2i−1, 2j) and a unit pixel P(2i, 2j−1) are used for detecting a G (Green) component, and a unit pixel P(2i, 2j) is used for detecting a B (Blue) component. Accordingly, unit pixels in an odd-numbered column in the pixel array section 111 are used for detecting R and G components, and unit pixels in an even-numbered column are used for detecting B and G components.

In this regard, hereinafter, an odd-numbered column of the pixel array section 111 is also referred to as an R column, and an even-numbered column is also referred to as a B column. Also, hereinafter, if it is not necessary to distinguish the unit pixels P(1, 1) to P(m, n) separately, the unit pixels are simply referred to as a unit pixel P. Further, hereinafter, a unit pixel is sometimes referred to simply as a pixel.

In the pixel array section 111, reset control lines LRST1 to LRSTm, transfer control lines LTGA1 to LTGAm, transfer control lines LTGB1 to LTGBm, and row selection control lines LSEL1 to LSELm are wired to the matrix-state pixel arrangement along the row direction for each pixel row. Also, in the pixel array section 111, vertical signal lines LV1 to LVn are wired to the matrix-state pixel arrangement along the column direction for each pixel column.

In this regard, hereinafter, if it is not necessary to distinguish the reset control lines LRST1 to LRSTm separately, the reset control lines are referred to simply as a reset control line LRST. Also, hereinafter, if it is not necessary to distinguish the transfer control lines LTGA1 to LTGAm separately, the transfer control lines are referred to simply as a transfer control line LTGA. Further, hereinafter, if it is not necessary to distinguish the transfer control lines LTGB1 to LTGBm separately, the transfer control lines are referred to simply as a transfer control line LTGB. Also, hereinafter, if it is not necessary to distinguish the row selection control lines LSEL1 to LSELm separately, the row selection control lines are referred to simply as a row selection control line LSEL. Further, hereinafter, if it is not necessary to distinguish the vertical signal lines LV1 to LVn separately, the vertical signal lines are simply referred to as a vertical signal line LV.

The bias-current control section 112 performs on and off control of the bias current for driving an amplification transistor (described later) in a unit pixel P under the control of the drive control section 116.

Specifically, the bias-current control section 112 includes switches 131-1 to 131-n, and current sources 132-1 to 132-n. The switches 131-1 to 131-n are connected between the vertical signal lines LV1 to LVn and the current sources 132-1 to 132-n, respectively. Ends of the current sources 132-1 to 132-n other than ends that are connected to the switches 131-1 to 131-n are connected to ground.

In this regard, hereinafter, if it is not necessary to distinguish the switches 131-1 to 131-n separately, the switches are referred to simply as a switch 131. Also, hereinafter, if it is not necessary to distinguish the current sources 132-1 to 132-n separately, the current sources are referred to simply as a current source 132.

A control signal Φon is supplied from the drive control section 116 to each switch 131. And when the control signal Φon is a predetermined High level (hereinafter, referred to as an H level), each switch 131 is turned on, a bias current flows through each vertical signal line LV, and the bias current is supplied to the amplification transistor of each unit pixel P. On the other hand, when the control signal Φon is a predetermined Low level (hereinafter, referred to as an L level), each switch 131 is turned off, and the bias current does not flow through each vertical signal line LV. In this manner, the bias-current control section 112 turns on or off the bias current supplied to the amplification transistor of the unit pixel P for each vertical signal line LV using each switch 131 under the control of the drive control section 116.

The input control section 113 performs input control of signals to ADCs 151-1 to 151-n of the AD conversion section 114 under the control of the drive control section 116.

Specifically, the input control section 113 includes switches 141-1 to 141-n, averaging circuits (AVEs) 142-1 to 142-p (=n/3), and multiplexers (MUXs) 143-1 to 143-q (=n/2).

In this regard, hereinafter, if it is not necessary to distinguish the switches 141-1 to 141-n separately, the switches 141-1 to 141-n are referred to simply as a switch 141. Also, hereinafter, if it is not necessary to distinguish the averaging circuits 142-1 to 142-p separately, the averaging circuits 142-1 to 142-p are referred to simply as an averaging circuit 142. Further, hereinafter, if it is not necessary to distinguish the multiplexers 143-1 to 143-q separately, the multiplexers 143-1 to 143-q are referred to simply as a multiplexer 143.

One switch 141 is disposed for each pixel column of the pixel array section 111. Two averaging circuits 142 are disposed for every six pixel columns of the pixel array section 111. One multiplexer 143 is disposed for every two pixel columns of the pixel array section 111. And one unit is formed by six switches 141, two averaging circuits 142, and three multiplexers 143.

Here, a description will be given of a unit including the switches 141-1 to 141-6, the averaging circuits 142-1 and 142-2, and the multiplexers 143-1 to 143-3.

One end of the switch 141-1 is connected to the vertical signal line LV1, and the other end is connected to one of input terminals of the averaging circuit 142-1 and the input terminal "a" of the multiplexer 143-1. The switch 141-1 connects the vertical signal line LV1 to either the averaging circuit 142-1 or the multiplexer 143-1 by the control signal Φave supplied from the drive control section 316.

One end of the switch 141-2 is connected to the vertical signal line LV2, and the other end is connected to one of input terminals of the averaging circuit 142-2 and the input terminal "b" of the multiplexer 143-1. The switch 141-2 connects the vertical signal line LV2 to either the averaging circuit 142-2 or the multiplexer 143-1 by the control signal Φave supplied from the drive control section 316.

One end of the switch 141-3 is connected to the vertical signal line LV3, and the other end is connected to one of input terminals of the averaging circuit 142-1 and the input terminal "a" of the multiplexer 143-2. The switch 141-3 connects the vertical signal line LV3 to either the averaging circuit 142-1 or the multiplexer 143-2 by the control signal Φave supplied from the drive control section 316.

One end of the switch 141-4 is connected to the vertical signal line LV4, and the other end is connected to one of input terminals of the averaging circuit 142-2 and the input terminal "b" of the multiplexer 143-2. The switch 141-4 connects the vertical signal line LV4 to either the averaging circuit 142-2 or the multiplexer 143-2 by the control signal Φave supplied from the drive control section 316.

One end of the switch 141-5 is connected to the vertical signal line LV5, and the other end is connected to one of input terminals of the averaging circuit 142-1 and the input terminal "a" of the multiplexer 143-3. The switch 141-5 connects the vertical signal line LV5 to either the averaging circuit 142-1 or the multiplexer 143-3 by the control signal Φave supplied from the drive control section 316.

One end of the switch 141-6 is connected to the vertical signal line LV6, and the other end is connected to one of input terminals of the averaging circuit 142-2 and the input terminal "b" of the multiplexer 143-3. The switch 141-6 connects the vertical signal line LV6 to either the averaging circuit 142-2 or the multiplexer 143-3 by the control signal Φave supplied from the drive control section 316.

The output terminal of the averaging circuit 142-1 is connected to the input terminal "c" of the multiplexer 143-1. The averaging circuit 142-1 supplies a smoothed pixel signal (hereinafter referred to as a smoothed pixel signal) by averaging the pixel signals supplied from the vertical signals line LV1, LV3, and LV5, respectively, to the multiplexer 143-1. Accordingly, the smoothed pixel signal supplied to the multiplexer 143-1 indicates the average of the pixel signals of three odd-numbered columns (R columns).

The output terminal of the averaging circuit 142-2 is connected to the input terminal "c" of the multiplexer 143-2. The averaging circuit 142-2 supplies a smoothed pixel signal by averaging the pixel signals input through the vertical signal lines LV2, LV4, and LV6 to the multiplexer 143-2. Accordingly, the smoothed pixel signal supplied to the multiplexer 143-2 indicates the average of the pixel signals of three even-numbered columns (B columns).

The output terminal of the multiplexer 143-1 is connected to the input terminal of the ADC (AD converter) 151-1 of the AD conversion section 114. And the multiplexer 143-1 selects one from the signals input into the input terminals "a" to "c" on the basis of a control signal Φmux supplied from the drive control section 116, and supplies the signal to the ADC 151-1. Accordingly, any one of the pixel signal of the first pixel column of the pixel array section 111, the pixel signal of the second pixel column, and the smoothed pixel signals of the first, the third, and the fifth pixel columns is supplied from the multiplexer 143-1 to the ADC 151-1.

The output terminal of the multiplexer 143-2 is connected to the input terminal of the ADC 151-2 of the AD conversion section 114. And the multiplexer 143-2 selects one from the signals input into the input terminals "a" to "c" on the basis of the control signal Φmux supplied from the drive control section 116, and supplies the signal to the ADC 151-2. Accordingly, any one of the pixel signal of the third pixel column of the pixel array section 111, the pixel signal of the fourth pixel column, and the smoothed pixel signal of the second, the fourth, and the sixth pixel columns is supplied from the multiplexer 143-2 to the ADC 151-2.

The output terminal of the multiplexer 143-3 is connected to the input terminal of the ADC 151-3 of the AD conversion section 114. Also, the input terminal "c" of the multiplexer 143-3 is connected to ground. And the multiplexer 143-3 selects one of the signals input into the input terminals "a"

and "b" on the basis of the control signal Φmux supplied from the drive control section 116, and supplies the signal to the ADC 151-3. Accordingly, either of the pixel signal of the fifth pixel column of the pixel array section 111 or the pixel signal of the sixth pixel column is supplied from the multiplexer 143-3 to the ADC 151-3.

In this regard, the other units of the input control section 113 have the same configuration as those of the above-described units.

The AD conversion section 114 performs AD conversion on the pixel signal supplied from the input control section 113. Specifically, the AD conversion section 114 includes the ADCs 151-1 to 151-$q$.

In this regard, hereinafter if it is not necessary to distinguish the ADCs 151-1 to 151-$q$ separately, the ADCs 151-1 to 151-$q$ are referred to simply as an ADC 151.

One ADC 151 is disposed for every two pixel columns of the pixel array section 111. That is to say, the CMOS image sensor 100 is a solid-state imaging device of a column AD method in which an ADC is shared by every two pixel columns. Each ADC 151 performs AD conversion on the pixel signal supplied from each multiplexer 143 under the control of the horizontal drive section 117, and outputs a digital pixel signal after the conversion to a horizontal signal line LH.

The vertical drive section 115 supplies a reset signal Φrst to unit pixels P of the pixel array section 111 through the reset control line LRST for each row so as to reset the unit pixel P for each row.

Also, the vertical drive section 115 supplies a transfer signal Φtga to unit pixels P of the odd-numbered columns of the pixel array section 111 for each row through the transfer control line LTGA so as to transfer the photoelectric charge stored in the photodiodes of the unit pixels P of the odd-numbered columns for each row. Further, The vertical drive section 115 supplies a transfer signal Φtgb to unit pixels P of even-numbered columns of the pixel array section 111 for each row through the transfer control line LTGB so as to transfer the photoelectric charges stored in the photodiodes of the unit pixels P of the even-numbered columns for each row.

Also, the vertical drive section 115 supplies a selection signal Φsel to unit pixels P of the pixel array section 111 through the row selection control line LSEL for each row so as to output of the pixel signals from the unit pixels P to the vertical signal line LV for each row.

As described above, the drive control section 116 supplies the control signal Φon to the bias-current control section 112 so as to control turning on and off of the bias current flowing through each vertical signal line LV. Also, as described above, the drive control section 116 supplies the control signal Φave and the control signal Φmux to the input control section 113 so as to control the pixel signal input to each ADC 151 of the AD conversion section 114. Further, as described later, the drive control section 116 controls switching modes between a high-resolution shooting mode in which pixel columns whose pixel signals are read is changed in time series so that a high-resolution image is shot, and a high-quality shooting mode in which pixel signals are read from all the pixel columns, and the pixel signals of the plurality of pixel columns are smoothed so that a high-quality image is shot.

The horizontal drive section 117 controls each ADC 151 of the AD conversion section 114 so as to control AD conversion of the pixel signal of each unit pixel P and output of the digital pixel signal after the conversion to the horizontal signal line LH.

1.2 Example of Configuration of Unit Pixel P

Figure 2:
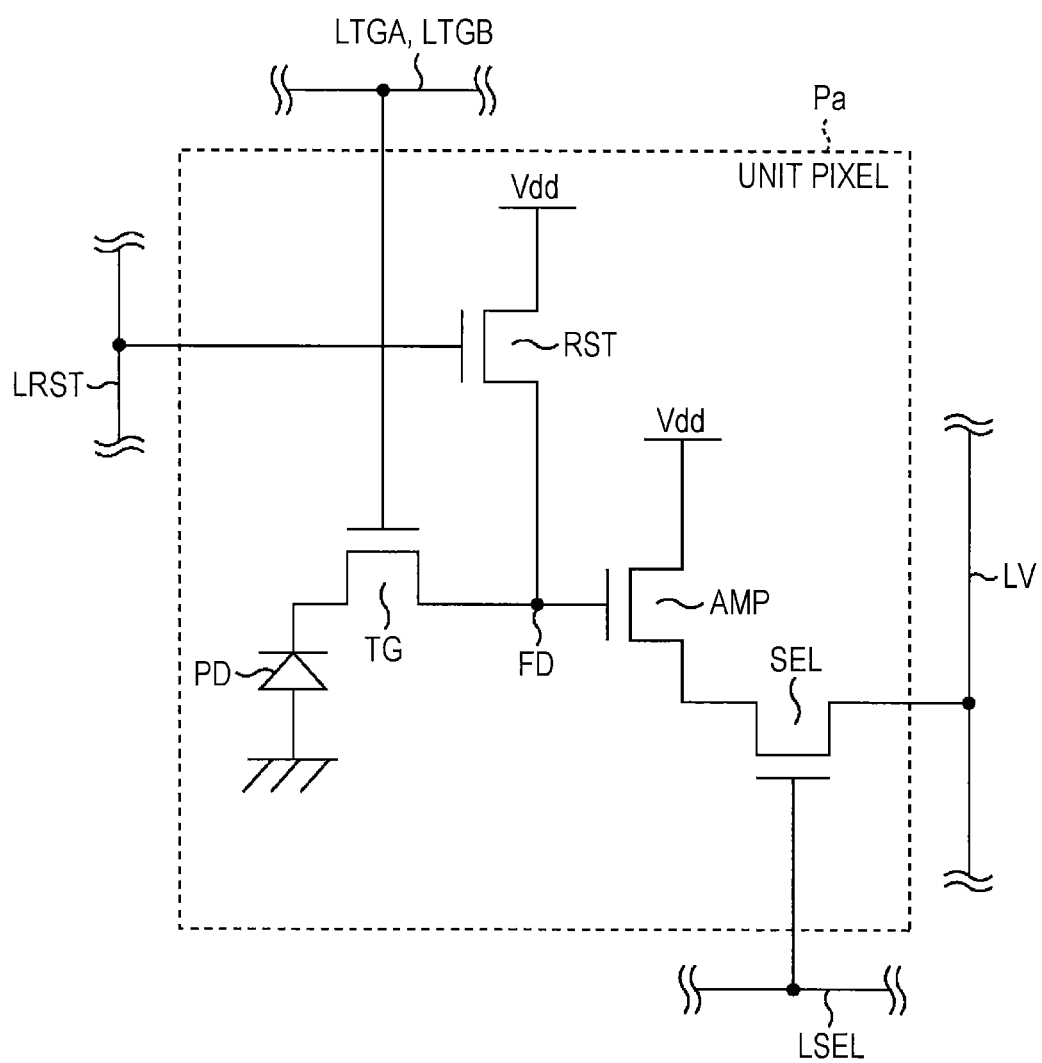
FIG. 2 is a diagram illustrating an example of a configuration of a unit pixel.

FIG. 2 illustrates an example of a configuration of a unit pixel that is applicable to the pixel array section 111 in FIG. 1.

A unit pixel Pa in FIG. 2 includes a photodiode PD, a transfer transistor TG, a reset transfer RST, an amplification transistor AMP, and a selection transistor SEL.

The photodiode PD photoelectrically converts incident light into the amount of photoelectric charge in accordance with the amount of light.

The transfer transistor TG is connected between the photodiode PD and a floating diffusion FD as an output node. If the unit pixel Pa is disposed in an odd-numbered column, the gate (transfer gate) of the transfer transistor TG is connected to the transfer control line LTGA, and if the unit pixel Pa is disposed in an even-numbered column, the gate of the transfer transistor TG is connected to transfer control line LTGB. And if a transfer signal Φtga or a transfer signal Φtgb is given to the gate of the transfer transistor TG through the transfer control line LTGA or the transfer control line LTGB, respectively, the transfer transistor TG transfers the photoelectric charge produced by the photoelectric conversion by the photodiode PD to the floating diffusion FD.

The reset transfer RST is connected through the power source Vdd and the floating diffusion FD. If a reset signal RST is given to the gate of the reset transistor RST through the reset control line LRST, the reset transistor RST resets the potential of the floating diffusion FD to the potential of the power source Vdd.

The gate of the amplification transistor AMP is connected to the floating diffusion FD. The amplification transistor AMP is connected to the vertical signal line LV through the selection transistor SEL, and forms a source follower with the current source 132 of the bias-current control section 112.

And when a control signal Φsel is given to the gate of the selection transistor SEL through the row selection control line LSEL, the selection transistor SEL is turned on. When the selection transistor SEL is turned on, the amplification transistor AMP amplifies the potential of the floating diffusion FD, and outputs a voltage in accordance with the potential to the vertical signal line LV. That is to say, a pixel signal produced by amplifying the signal based on the photoelectric charge depending on the amount of received light of the photodiode PD is output from the unit pixel Pa to the vertical signal line LV. And the pixel signal output from each unit pixel Pa is supplied to the input control section 113 through the vertical signal line LV.

These operations are performed on the individual pixels in one row of odd-numbered columns, or the individual pixels in one row of even-numbered columns at the same time, because, for example, the gate of the transfer transistor TG is connected for each row and for each odd-numbered column and for each even-numbered column, and the gate of the reset transistor RST and the gate of the selection transistor SEL are connected for each row.

1.3 Operation of CMOS Image Sensor 100

Figure 3:
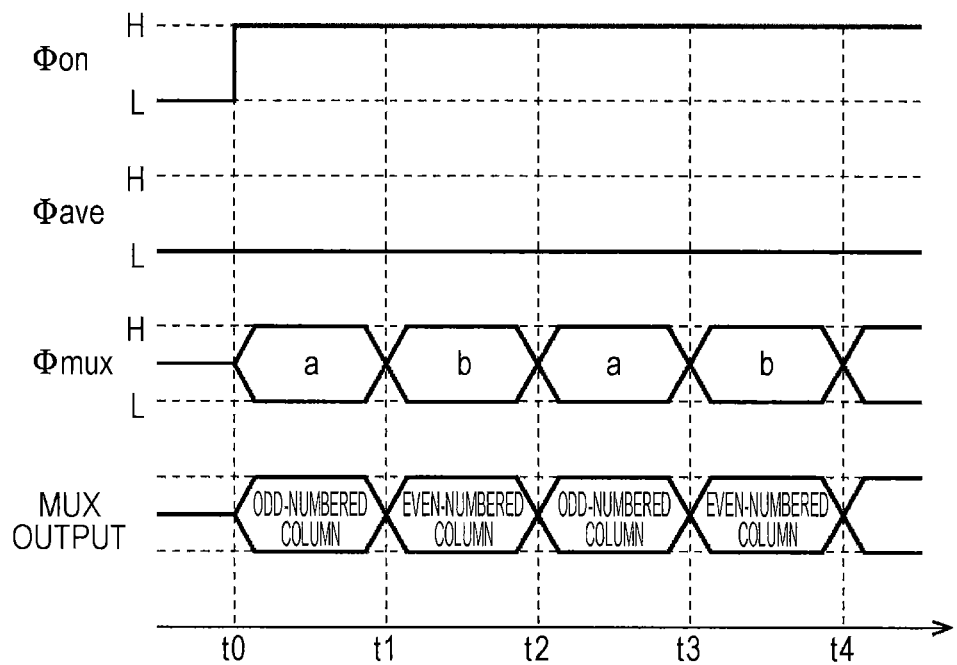
FIG. 3 is a timing chart for explaining operation at the time of high-resolution shooting mode of the solid-state imaging device in FIG. 1.
Figure 4:
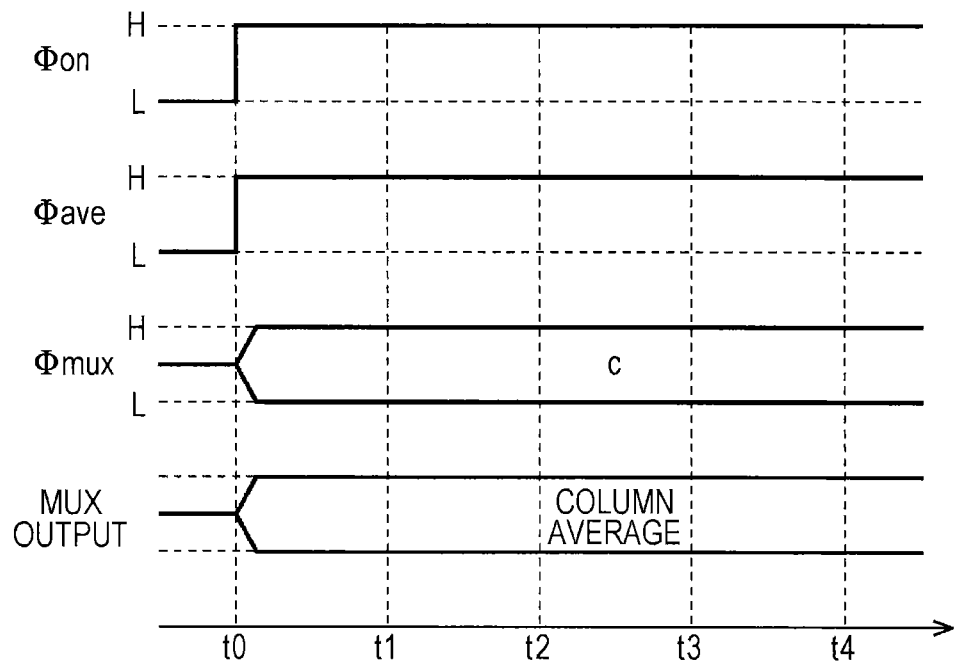
FIG. 4 is a timing chart for explaining operation at the time of high-quality shooting mode of the solid-state imaging device in FIG. 1.

Next, a description will be given of operation of the CMOS image sensor 100 with reference to timing charts in FIG. 3 and FIG. 4.

First, a description will be given of the CMOS image sensor 100 at the time of high-resolution shooting mode with reference to the timing chart in FIG. 3.

Before time t0 when shooting is started, the control signal Φon and the control signal Φave are set at the L level. Also, the control signal Φmux is not output.

At time t0, the control signal Φon is set to the H level. Thereby, each switch 131 is turned on, and the bias current flows through each vertical signal line LV.

Also, the value of the control signal Φmux is set so that each multiplexer 143 outputs the pixel signal that is input into the input terminal "a". Thereby, each multiplexer 143 outputs the pixel signal that is input into the input terminal "a", that is to say, the pixel signal supplied from the vertical signal line LV of odd-numbered columns of the pixel array section 111.

And during a time period from time t0 to time t1, the pixel signals of the odd-numbered columns for one frame are read for each row under the control of the vertical drive section 115 and the horizontal drive section 117.

Next, at time t1, the value of the control signal Φmux is set so that each multiplexer 143 outputs the pixel signal that is input into the input terminal "b". Thereby, each multiplexer 143 outputs the pixel signal that is input into the input terminal "b", that is to say, the pixel signal supplied from the vertical signal line LV of the even-numbered columns of the pixel array section 111.

And during a time period from time t1 to time t2, the pixel signals of the even-numbered columns for one frame are read for each row under the control of the vertical drive section 115 and the horizontal drive section 117.

Next, at time t2, the value of the control signal Φmux is set so that each multiplexer 143 outputs the pixel signal that is input into the input terminal "a", and thus the state become the same as that at time t0.

And during a time period from time t2 to time t3, the pixel signals of the odd-numbered columns for one frame are read for each row under the control of the vertical drive section 115 and the horizontal drive section 117.

Next, at time t3, the value of the control signal Φmux is set so that each multiplexer 143 outputs the pixel signal that is input into the input terminal "b", and thus the state become the same as that at time t1.

And during a time period from time t3 to time t4, the pixel signals of the even-numbered columns for one frame are read for each row under the control of the vertical drive section 115 and the horizontal drive section 117.

After that, the same operation is repeated.

In this manner, the pixel signals of the pixels of the odd-numbered column (R column) and the even-numbered column (B column) in the pixel array section 111 are alternately read. Thereby, it is possible to obtain a high-resolution image having the same resolution as the number of pixels disposed in the pixel array section 111.

Next, a description will be given of operation of the CMOS image sensor 100 at the time of high-quality shooting mode with reference to a timing chart in FIG. 4.

Before time t0 when shooting is started, the control signal Φon and the control signal Φave are set at the L level. Also, the control signal Φmux is not output.

At time t0, the control signal Φon is set to the H level. Thereby, each switch 131 is turned on, and the bias current flows through each vertical signal line LV.

Also, the control signal Φave is set to the H level. Thereby, a smoothed pixel signal indicating the average of the pixel signals of the vertical signal lines LV1 of the i-th, the (i+2)-th, and the (i+4)-th columns is input from the multiplexer 143-(3i−2) to the ADC 151-(3i−2). Also, a smoothed pixel signal indicating the average of the pixel signals of the vertical signal lines LV1 of the (i+1)-th, the (i+3)-th, and the (i+5)-th columns is input from the multiplexer 143-(3i−1) to the ADC 151-(3i−1).

And, a smoothed pixel signal indicating the average of the pixel signals of the three odd-numbered columns (R column), and a smoothed pixel signal indicating the average of the pixel signals of the three even-numbered columns (B column) are read in parallel for each row under the control of the vertical drive section 115 and the horizontal drive section 117.

Thereby, it is possible to obtain a high-quality image having a lower resolution than that in the high-resolution shooting mode, but having less noise by the smoothing. Also, the pixel signals of the R columns and the B columns are read at the same time, and thus it becomes possible to shoot at a higher speed than in the high-resolution shooting mode.

1.4 Specific Example of Input Control Section 113

Figure 5:
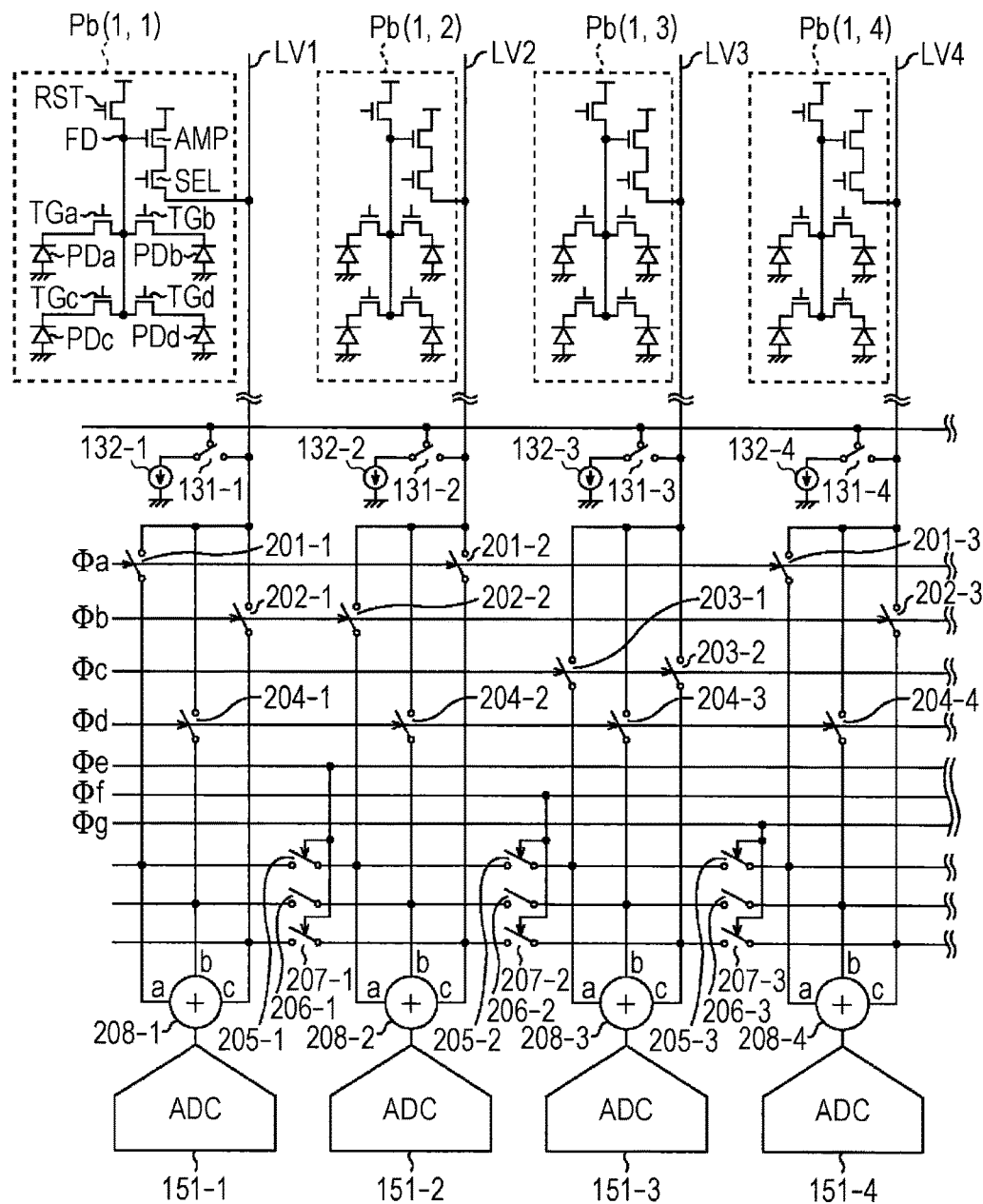
FIG. 5 is a circuit diagram illustrating an example of a configuration in which an input control section of the solid-state imaging device in FIG. 1 is more specified.

FIG. 5 illustrates a part of an example of a configuration of a CMOS image sensor 100 in which the input control section 113 in FIG. 1 is more specified. In this regard, in FIG. 5, a same symbol is given to a part corresponding to that in FIG. 1.

In this regard, in the example of the configuration, shared pixels Pb(1, 1) to Pb(r, s) having a different circuit configuration as those of the unit pixel Pa in FIG. 2 are disposed in the pixel array section 111. In the shared pixel Pb(1, 1) to Pb(r, s), a part of constituent elements are shared among pixels with two rows by two columns. Accordingly, if it is assumed that pixels with m rows and n columns are disposed in the pixel array section 111, it becomes that r=m/2, s=2/n.

In this regard, hereinafter if it is not necessary to distinguish the shared pixels Pb(1, 1) to Pb(r, s) separately, the shared pixels are referred to simply as a shared pixel Pb.

The shared pixel Pb includes photodiodes PDa to PDd, transfer transistors TGa to TGd, a reset transistor RST, an amplification transistor AMP, and a selection transistor SEL. And the photodiodes PDa to PDd, and the transfer transistors TGa to TGd are disposed for each pixel, and the reset transistor RST, the amplification transistor AMP, and the selection transistor SEL are shared among pixels with two rows by two columns.

As described above, individual pixels are disposed in accordance with the Bayer arrangement in the pixel array section 111. Accordingly, for example, the photodiode PDa and the transfer transistor TGa are used for detecting an R component, the photodiodes PDb and PDc, and the transfer transistors TGb and TGc are used for detecting a G component, and the photodiode PDd and the transfer transistor TGd are used for detecting a B component.

Also, for example, the gate of the transfer transistor TGa is connected to the i-th transfer control line LTGA, the gate of the transfer transistor TGb is connected to the i-th transfer control line LTGB. Further, for example, the gate of the transfer transistor TGc is connected to the (i+1)-th transfer control line LTGA, and the gate of the transfer transistor TGd is connected to the (i+1)-th transfer control line LTGB.

Accordingly, when the transfer signal Φtga is given to the gate of the transfer transistor TGa through the i-th transfer control line LTGA, the transfer transistor TGa transfers the photoelectric charge produced by photoelectric conversion by the photodiode PDa to the floating diffusion FD. And the pixel signal in accordance with the photoelectric charge stored in the floating diffusion FD is output to the vertical signal line LV.

Also, when the transfer signal Φtgb is given to the gate of the transfer transistor TGb through the i-th transfer control line LTGB, the transfer transistor TGb transfers the photoelectric charge produced by photoelectric conversion by the photodiode PDb to the floating diffusion FD. And the pixel signal in accordance with the photoelectric charge stored in the floating diffusion FD is output to the vertical signal line LV.

Further, when the transfer signal Φtga is given to the gate of the transfer transistor TGc through the (i+1)-th transfer control line LTGA, the transfer transistor TGc transfers the photoelectric charge produced by photoelectric conversion by the photodiode PDc to the floating diffusion FD. And the pixel signal in accordance with the photoelectric charge stored in the floating diffusion FD is output to the vertical signal line LV.

Also, when the transfer signal Φtgb is given to the gate of the transfer transistor TGd through the (i+1)-th transfer control line LTGB, the transfer transistor TGd transfers the photoelectric charge produced by photoelectric conversion by the photodiode PDd to the floating diffusion FD. And the pixel signal in accordance with the photoelectric charge stored in the floating diffusion FD is output to the vertical signal line LV.

In this manner, in the shared pixel Pb, it is possible to separately read pixel signals based on photoelectric charges stored in the photodiodes PDa to PDd.

Also, in the example of the configuration, the input control section 113 includes switches 201-1 to 201-2$s$/3, switches 202-1 to 202-2$s$/3, switches 203-1 to 203-2$s$/3, switches 204-1 to 204-$s$, switches 205-1 to 205-($s$−1), switches 206-1 to 206-($s$−1), switches 207-1 to 207-($s$−1), and adders 208-1 to 208-$s$.

In this regard, a range to be one operation unit of the input control section 113 is illustrated in FIG. 5. In the following, a description will be given of a circuit configuration and operation of the input control section 113 in the range illustrated in FIG. 5.

The switch 201-1 is connected between the vertical signal line LV1 and the input terminal "a" of the adder 208-1. The switch 201-2 is connected between the vertical signal line LV2 and the input terminal "c" of the adder 208-2. The switch 201-3 is connected between the vertical signal line LV4 and the input terminal "a" of the adder 208-4.

The switch 202-1 is connected between the vertical signal line LV1 and the input terminal "c" of the adder 208-1. The switch 202-2 is connected between the vertical signal line LV2 and the input terminal "a" of the adder 208-2. The switch 201-3 is connected between the vertical signal line LV4 and the input terminal "c" of the adder 208-4.

The switch 203-1 is connected between the vertical signal line LV3 and the input terminal "a" of the adder 208-3. The switch 203-2 is connected between the vertical signal line LV3 and the input terminal "c" of the adder 208-3.

The switch 204-1 is connected between the vertical signal line LV1 and the input terminal "b" of the adder 208-1. The switch 204-2 is connected between the vertical signal line LV2 and the input terminal "b" of the adder 208-2. The switch 204-3 is connected between the vertical signal line LV3 and the input terminal "b" of the adder 208-3. The switch 204-4 is connected between the vertical signal line LV4 and the input terminal "b" of the adder 208-4.

The switch 205-1 is connected between the input terminal "a" of the adder 208-1 and the input terminal "a" of the adder 208-2. The switch 205-2 is connected between the input terminal "a" of the adder 208-2 and the input terminal "a" of the adder 208-3. The switch 205-3 is connected between the input terminal "a" of the adder 208-3 and the input terminal "a" of the adder 208-4.

The switches 206-1 is connected between the input terminal "b" of the adder 208-1 and the input terminal "b" of the adder 208-2. The switch 206-2 is connected between the input terminal "b" of the adder 208-2 and the input terminal "b" of the adder 208-3. The switch 206-3 is connected between the input terminal "b" of the adder 208-3 and the input terminal "b" of the adder 208-4.

The switch 207-1 is connected between the input terminal "c" of the adder 208-1 and the input terminal "c" of the adder 208-2. The switch 207-2 is connected between the input terminal "c" of the adder 208-2 and the input terminal "c" of the adder 208-3. The switch 207-3 is connected between the input terminal "c" of the adder 208-3 and the input terminal "c" of the adder 208-4.

The switches 201-1 to 201-3 receive the control signal Φa supplied from the drive control section 116, and are turned on when the control signal Φa is the H level, and are turned off when the control signal Φa is the L level.

The switches 202-1 to 202-3 receive the control signal Φb supplied from the drive control section 116, and are turned on when the control signal Φb is the H level, and are turned off when the control signal Φb is the L level.

The switches 203-1 and 203-2 receive the control signal Dc supplied from the drive control section 116, and are turned on when the control signal Φc is the H level, and are turned off when the control signal Φc is the L level.

The switches 204-1 to 204-4 receive the control signal Φd supplied from the drive control section 116, and are turned on when the control signal Φd is the H level, and are turned off when the control signal Φd is the L level.

The switches 205-1 to 207-1 receive the control signal Φe supplied from the drive control section 116, and are turned on when the control signal Φe is the H level, and are turned off when the control signal Φe is the L level.

The switches 205-2 to 207-2 receive the control signal Φf supplied from the drive control section 116, and are turned on when the control signal Φf is the H level, and are turned off when the control signal Φf is the L level.

The switches 205-3 to 207-3 receive the control signal Φg supplied from the drive control section 116, and are turned on when the control signal Φg is the H level, and is turned off when the control signal Φg is the L level.

The switches 206-1 to 206-3 are turned off all the time.

The adders 208-1 to 208-4 add signals that are input into the input terminals "a" to "c", and supplies the sum signals to the ADCs 151-1 to 151-4, respectively.

In this regard, the range in input control section 113 that is not illustrated in FIG. 5 has the same configuration as the range illustrated in FIG. 5.

1.5 Operation of Circuit in FIG. 5

Figure 6:
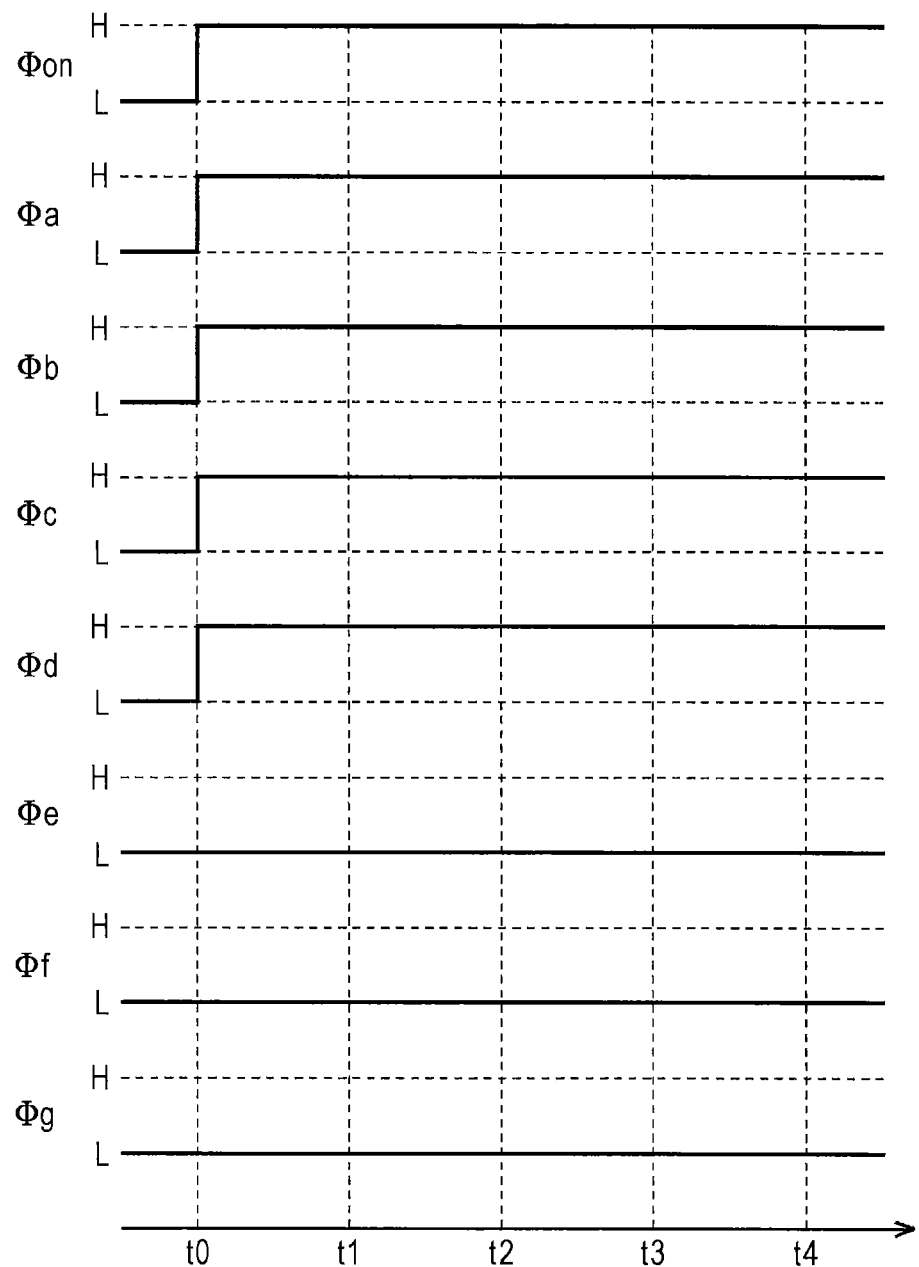
FIG. 6 is a timing chart for explaining operation at the time of high-resolution shooting mode of the circuit in FIG. 5.
Figure 7:
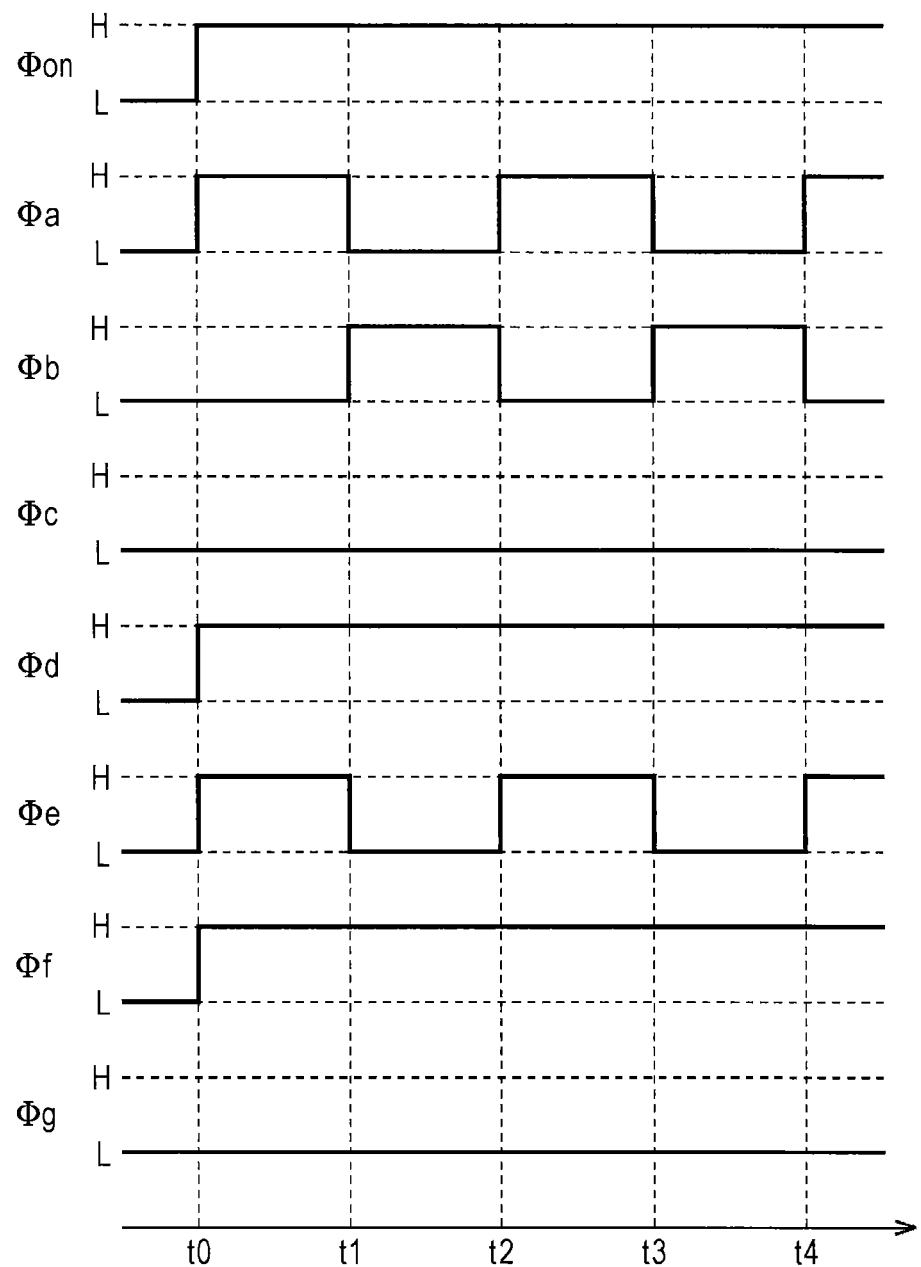
FIG. 7 is a timing chart for explaining operation at the time of high-quality shooting mode of the circuit in FIG. 5.

Next, a description will be given of operation of the circuit in FIG. 5 with reference to timing charts in FIG. 6 and FIG. 7.

First, a description will be given of operation of the circuit in FIG. 5 at the time of high-resolution shooting mode with reference to the timing chart in FIG. 6.

Before time t0 when shooting is started, the control signals Φon to Φg are all set at the L level.

At time t0, the control signal Φon is set to the H level. Thereby, the switches 131-1 to 131-4 are turned on, and the bias current flows through the vertical signal lines LV1 to LV4.

Also, the control signals Φa to Φd are set to the H level. Thereby, the switches 201-1 to 201-3, the switches 202-1 to 202-3, switches 203-1 and 203-2, and the switches 204-1 to 204-4 are turned on.

And the pixel signal flowing through the vertical signal line LV1 is divided into three, and are input into the adder 208-1 to be added. As a result, the pixel signal flowing through the vertical signal line LV1 is output from the adder 208-1 without change, and is input into the ADC 151-1. In the same manner, the pixel signals flowing through the vertical signal lines LV2 to LV4 are output from the adders 208-2 to 208-4 without change, and are input into the ADCs 151-1 to 151-4, respectively.

And under the control of vertical drive section 115 and the horizontal drive section 117, reading of the pixel signals of odd-numbered columns (R columns) of one frame for each row and reading of the pixel signals of even-numbered columns (B columns) of one frame for each row are performed alternately. Thereby, it is possible to obtain a high-resolution image having the same resolution as the number of pixels disposed in the pixel array section 111.

Next, a description will be given of operation of the circuit in FIG. 5 at the time of high-quality shooting mode with reference to a timing chart in FIG. 7.

Before time t0 when shooting is started, the control signals Φon to Φg are all set at the L level.

At time t0, the control signal Φon is set to the H level. Thereby, the switches 131-1 to 131-4 are turned on, and the bias current flows through the vertical signal lines LV1 to LV4.

Also, the control signals Φa, and Φd to Φf are set to the H level. Thereby, the switches 201-1 to 201-3, the switches 204-1 to 204-4, the switches 205-1 and 205-2, the switch 207-1, and the switch 207-2 are turned on.

Thereby, the pixel signal that flows through the vertical signal line LV1 is input into the input terminal "a" of the adder 208-3 through the switch 201-1, the switch 205-1, and the switch 205-2. The pixel signal that flows through the vertical signal line LV2 is input into the input terminal "c" of the adder 208-3 through the switch 201-2 and the switch 207-2. The pixel signal that flows through the vertical signal line LV3 is input into the input terminal "b" of the adder 208-3 through the switch 204-3. Accordingly, the adder 208-3 outputs a smoothed pixel signal that has been subjected to smoothing by adding the pixel signals flowing through the vertical signal lines LV1 to LV3, and the smoothed pixel signal is input into the ADC 151-3.

And during a time period from time t0 to time t1, the smoothed pixel signal indicating the average of the pixel signals for three odd-numbered columns (R columns) for one frame is read for each row under the control of the vertical drive section 115 and the horizontal drive section 117.

Next, at time t1, the control signals Φa and Φe are set to the L level, and the control signals Φb and Φg are set to the H level. Thereby, the switches 201-1 to 201-3, the switch 205-1, and the switch 207-1 are turned off, and the switches 202-1 to 202-3, the switch 205-3, and the switch 207-3 are turned on.

Thereby, the pixel signal that flows through the vertical signal line LV2 is input into the input terminal "a" of the adder 208-3 through the switch 202-2 and the switch 205-2. The pixel signal that flows through the vertical signal line LV3 is input into the input terminal "b" of the adder 208-3 through the switch 204-3. The pixel signal that flows through the vertical signal line LV4 is input into the input terminal "c" of the adder 208-3 through the switch 202-3 and the switch 207-3. Accordingly, the adder 208-3 outputs a pixel signal produced by adding the pixel signals that flow the vertical signal lines LV2 to LV4, and the pixel signal is input into the ADC 151-3.

And during a time period from time t1 to time t2, a smoothed pixel signal indicating the average of the pixel signals for three even-numbered columns (B columns) for one frame is read for each row under the control of the vertical drive section 115 and the horizontal drive section 117.

At time t2, the control signals Φb and Φg are set to the L level, the control signals Φa and Φe are set to the H level, and thus the result becomes the same state as the state at time t0.

And during a time period from time t2 to time t3, a smoothed pixel signal indicating the average of the pixel signals for three odd-numbered columns (R columns) for one frame is read for each row under the control of the vertical drive section 115 and the horizontal drive section 117.

At time t3, the control signals Φa and Φe are set to the L level, the control signals Φb and Φg are set to the H level, and thus the result becomes the same state as the state at time t0.

And during a time period from time t3 to time t4, a smoothed pixel signal indicating the average of the pixel signals for three even-numbered columns (B columns) for one frame is read for each row under the control of the vertical drive section 115 and the horizontal drive section 117.

After that, the same operation is repeated.

In this manner, it is possible to obtain the high-quality image having lower resolution than the high-resolution shooting mode, but less noise by the smoothing.

In this regard, in the high-quality shooting mode of the circuit in FIG. 5, it is difficult to read the pixel signals of the R columns and the B columns at the same time, and thus it is necessary to alternately read the pixel signals. Accordingly, compared with the case of the timing chart in FIG. 4 described above, the shooting speed becomes about two times.

2. Example of Solid-State Imaging Device to which the Present Technique is Applied Next, a description will be given of an example of a solid-state imaging device to which the present technique is applied with reference to FIG. 8 to FIG. 13.

2.1 Basic System Configuration

Figure 8:
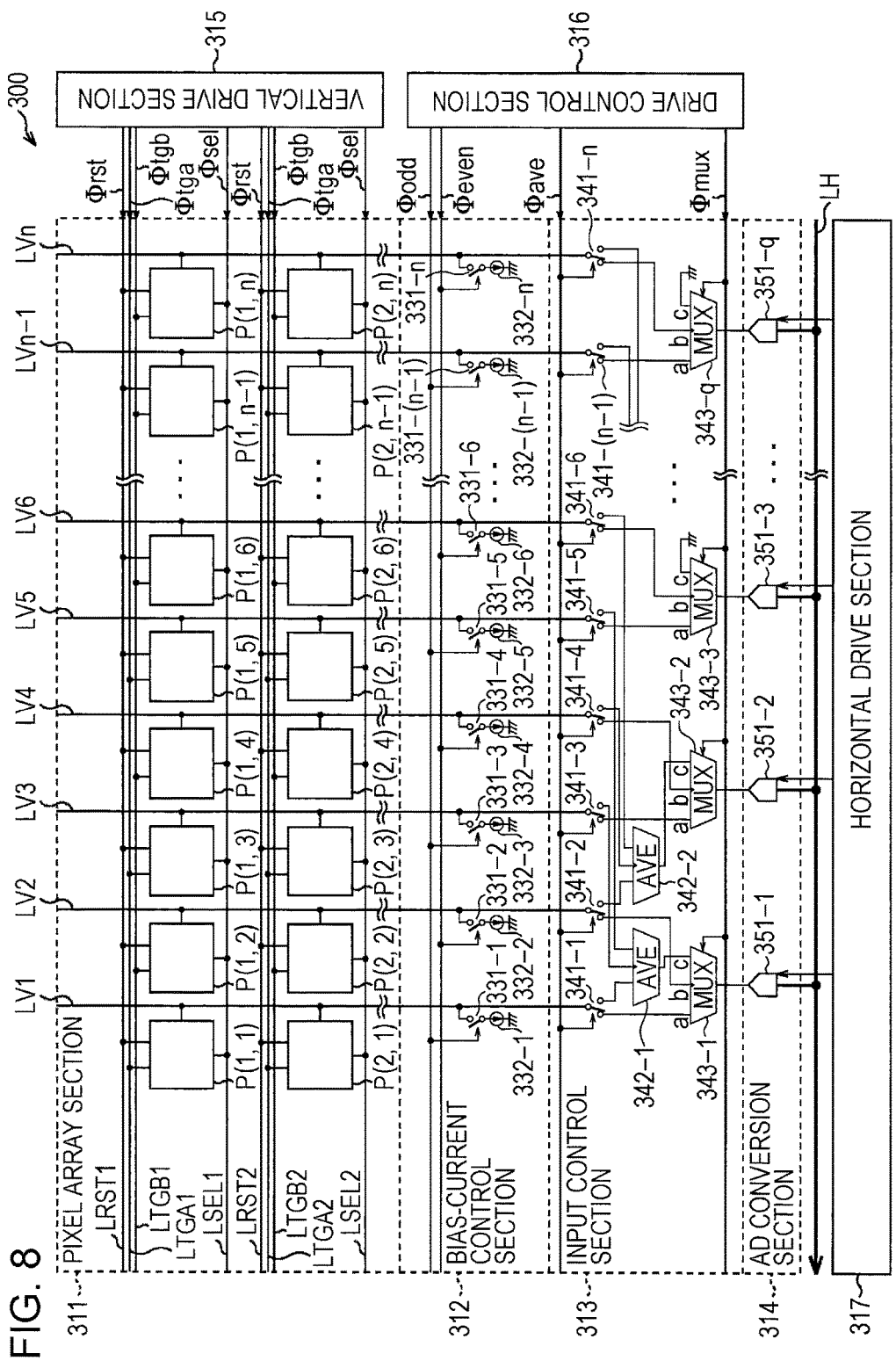
FIG. 8 is a schematic diagram of a basic system configuration of a solid-state imaging device to which the present technique is applied.

FIG. 8 is a system configuration diagram illustrating a schematic configuration of a solid-state imaging device, for example, a CMOS image sensor, which is a kind of X-Y address type solid-state imaging device, to which the present technique is applied.

The CMOS image sensor 300 includes a pixel array section 311 formed on a semiconductor substrate (chip) not illustrated in FIG. 8, and a peripheral circuit section integrated on the same semiconductor substrate as that of the pixel array section 311. The peripheral circuit section includes, for example, a bias-current control section 312, an input control section 313, an AD conversion section 314, a vertical drive section 315, a drive control section 316, and a horizontal drive section 317.

Among them, the pixel array section 311, the input control section 313, the AD conversion section 314, the vertical drive section 315, and the horizontal drive section 317 have the same configurations as those of the pixel array section 111, the input control section 113, the AD conversion section 114, the vertical drive section 115, and the horizontal drive section 117 of the CMOS image sensor 100 in FIG. 1, respectively. And the descriptions thereof are repetitions, and thus are omitted.

The bias-current control section 312 performs on and off control of the bias current for driving the amplification transistor AMP in a unit pixel P under the control of the drive control section 316.

Specifically, the bias-current control section 312 includes switches 331-1 to 331-n and current sources 332-1 to 332-n. The switches 331-1 to 331-n are connected between the vertical signal line LV1 to LVn and the current sources 332-1 to 332-n, respectively. Ends of the current sources 332-1 to 332-n other than ends that are connected to the switches 331-1 to 331-n are connected to ground.

In this regard, hereinafter, if it is not necessary to distinguish the switches 331-1 to 331-n separately, the switches are referred to simply as a switch 331. Also, hereinafter, if it is not necessary to distinguish the current sources 332-1 to 332-n separately, the current sources is referred to simply as a current source 332.

A control signal Φodd is supplied from the drive control section 316 to the switch 331 disposed in the vertical signal line LV of odd-numbered columns. And when the control signal Φodd is an H level, the switch 331 of an odd-numbered column is turned on, a bias current flows through the vertical signal line LV of the odd-numbered column, and is supplied to the amplification transistor AMP in a unit pixel P of the odd-numbered column. On the other hand, when the control signal Φodd is an L level, the switch 331 of the odd-numbered column is turned off, and the bias current does not flow through the vertical signal line LV of the odd-numbered column.

A control signal Φeven is supplied from the drive control section 316 to the switch 331 disposed in the vertical signal line LV of even-numbered columns. And when the control signal Φeven is the H level, the switch 331 of the even-numbered column is turned on, a bias current flows through the vertical signal line LV of the odd-numbered column, and is supplied to the amplification transistor AMP in a unit pixel P of the even-numbered column. On the other hand, when the control signal Φeven is the L level, the switch 331 of the even-numbered column is turned off, and the bias current does not flow through the vertical signal line LV of the even-numbered column.

As described above, the drive control section 316 supplies the control signal Φodd and the control signal Φeven to the bias-current control section 312 so as to control turning on and off of the bias current flowing through each vertical signal line LV. Also, the drive control section 316 supplies the control signal Φave and the control signal Φmux to the input control section 313 so as to control the pixel signal input to each ADC 351 of the AD conversion section 314. Further, the drive control section 316 controls switching modes between a high-resolution shooting mode in which pixel columns whose pixel signals are read is changed in time series so that a high-resolution image is shot, and a high-quality shooting mode in which pixel signals are read from all the pixel columns, and the pixel signals of the plurality of pixel columns are smoothed so that a high-quality image is shot.

2.2 Operation of CMOS Image Sensor 300

Figure 9:
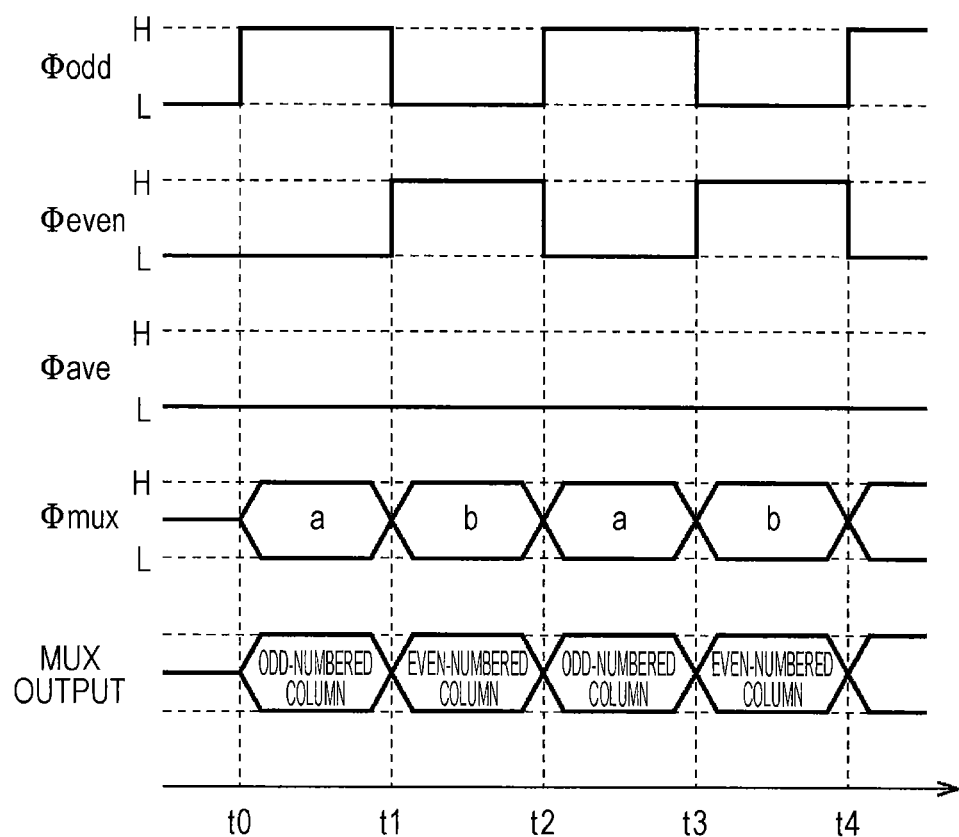
FIG. 9 is a timing chart for explaining operation at the time of high-resolution shooting mode of the solid-state imaging device in FIG. 8.
Figure 10:
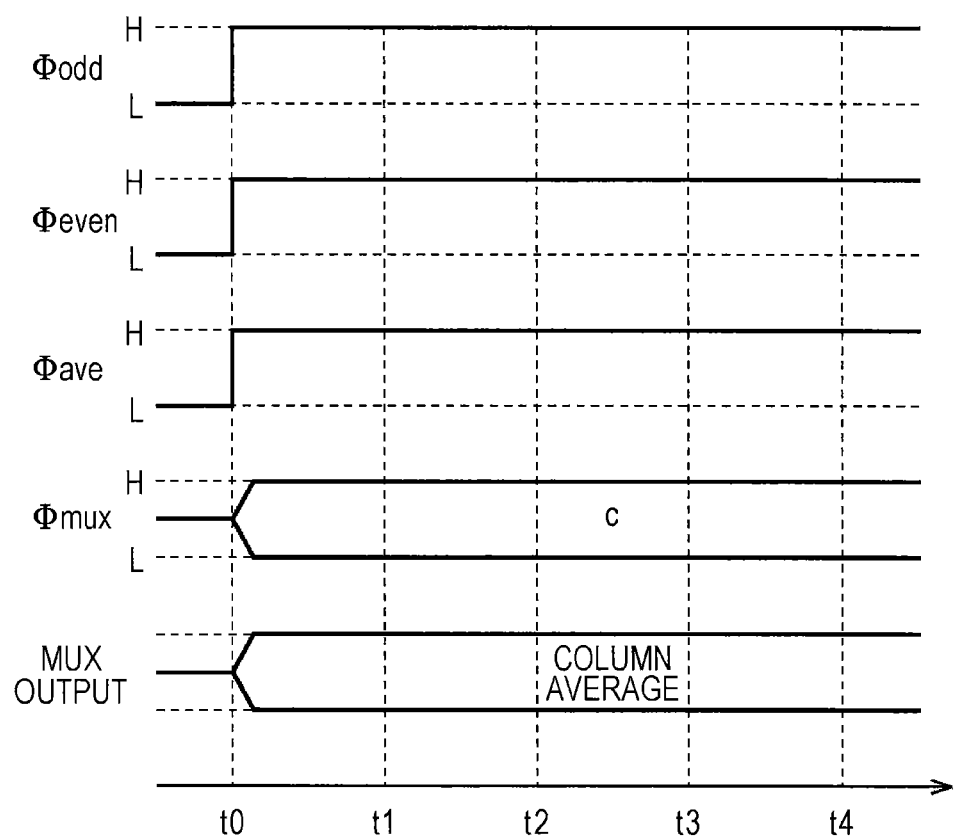
FIG. 10 is a timing chart for explaining operation at the time of high-quality shooting mode of the solid-state imaging device in FIG. 8.

Next, a description will be given of operation of the CMOS image sensor 300 with reference to timing charts in FIG. 9 and FIG. 10.

First, a description will be given of the CMOS image sensor 300 at the time of high-resolution shooting mode with reference to the timing chart in FIG. 9.

Before time t0 when shooting is started, from the control signal Φodd to the control signal Φave are set at the L level. Also, the control signal Φmux is not output.

At time t0, the control signal Φodd is set to the H level. Thereby, each switch 131 in the odd-numbered columns is turned on, and the bias current flows through each vertical signal line LV of the odd-numbered columns. On the other hand, a bias current does not flow through each vertical signal line LV of the even-numbered columns.

Also, the value of the control signal Φmux is set so that each multiplexer 343 outputs the pixel signal that is input into the input terminal "a". Thereby, each multiplexer 343 outputs the pixel signal that is input into the input terminal "a", that is to say, the pixel signal supplied from the vertical signal line LV of odd-numbered columns of the pixel array section 311.

And during a time period from time t0 to time t1, the pixel signals of the odd-numbered columns for one frame are read for each row under the control of the vertical drive section 315 and the horizontal drive section 317.

Next, at time t1, the control signal Φodd is set to the L level, and the control signal Φeven is set to the H level. Thereby, each switch 331 in the odd-numbered column is turned off, and the bias current does not flow through the vertical signal line LV of the odd-numbered column. On the other hand, each switch 331 in the even-numbered column is turned on, and the bias current flows through the vertical signal line LV of the even-numbered column.

Also, the value of the control signal Φmux is set so that each multiplexer 343 outputs the pixel signal that is input into the input terminal "b". Thereby, each multiplexer 343 outputs the pixel signal that is input into the input terminal "b", that is to say, the pixel signal supplied from the vertical signal line LV of the even-numbered columns of the pixel array section 311.

And during a time period from time t1 to time t2, the pixel signals of the even-numbered columns for one frame are read for each row under the control of the vertical drive section 315 and the horizontal drive section 317.

Next, at time t2, the control signal Φeven is set to the L level, the control signal Φodd is set to the H level, and the value of the control signal Φmux is set so that each multiplexer 343 outputs the pixel signal that is input into the input terminal "a". That is to say, the result becomes the same state as the state at time t0.

And during a time period from time t2 to time t3, the pixel signals of the odd-numbered columns for one frame are read for each row under the control of the vertical drive section 315 and the horizontal drive section 317.

Next, at time t3, the control signal Φodd is set to the L level, the control signal Φeven is set to the H level, and the value of the control signal Φmux is set so that each multiplexer 343 outputs the pixel signal that is input into the input terminal "b". That is to say, the result becomes the same state as the state at time t1.

And during a time period from time t3 to time t4, the pixel signals of the even-numbered columns for one frame are read for each row under the control of the vertical drive section 315 and the horizontal drive section 317.

After that, the same operation is repeated.

In this manner, the pixel signals of the pixels of the odd-numbered column (R column) and the even-numbered column (B column) in the pixel array section 311 are alternately read. Thereby, it is possible to obtain a high-resolution image having the same resolution as the number of pixels disposed in the pixel array section 311.

Also, the bias current does not flow through the vertical signal line LV of the pixel column that is not read. Thereby, it is possible to reduce power consumption of the CMOS image sensor 300.

Next, a description will be given of operation of the CMOS image sensor 300 at the time of high-quality shooting mode with reference to the timing chart in FIG. 10.

Before time t0 when shooting is started, the control signal Φodd and the control signal Φave are set at the L level. Also, the control signal Φmux is not output.

At time t0, the control signal Φodd and the control signal Φeven are set to the H level. Thereby, regardless of whether an odd-numbered column or an even-numbered column, each switch 331 is turned on, and the bias current flows through the vertical signal line LV.

Also, the control signal Φave is set to the H level. Thereby, a smoothed pixel signal indicating the average of the pixel signals of the vertical signal lines LV1 of the i-th, the (i+2)-th, and the (i+4)-th columns is input from the multiplexer 343-(3i−2) to the ADC 351-(3i−2). Also, a smoothed pixel signal indicating the average of the pixel signals of the vertical signal lines LV1 of the (i+1)-th, the (i+3)-th, and the (i+5)-th columns is input from the multiplexer 343-(3i−1) to the ADC 351-(3i−1).

And, a smoothed pixel signal indicating the average of the pixel signals of the three odd-numbered columns (R column), and a smoothed pixel signal indicating the average of the pixel signals of the three even-numbered columns (B column) are read in parallel for each row under the control of the vertical drive section 315 and the horizontal drive section 317.

Thereby, it is possible to obtain a high-quality image having a lower resolution than that in the high-resolution shooting mode, but having less noise by the smoothing. Also, the pixel signals of the R columns and the B columns are read at the same time, and thus it becomes possible to shoot at a higher speed than in the high-resolution shooting mode.

2.3 Specific Example of Input Control Section 313

Figure 11:
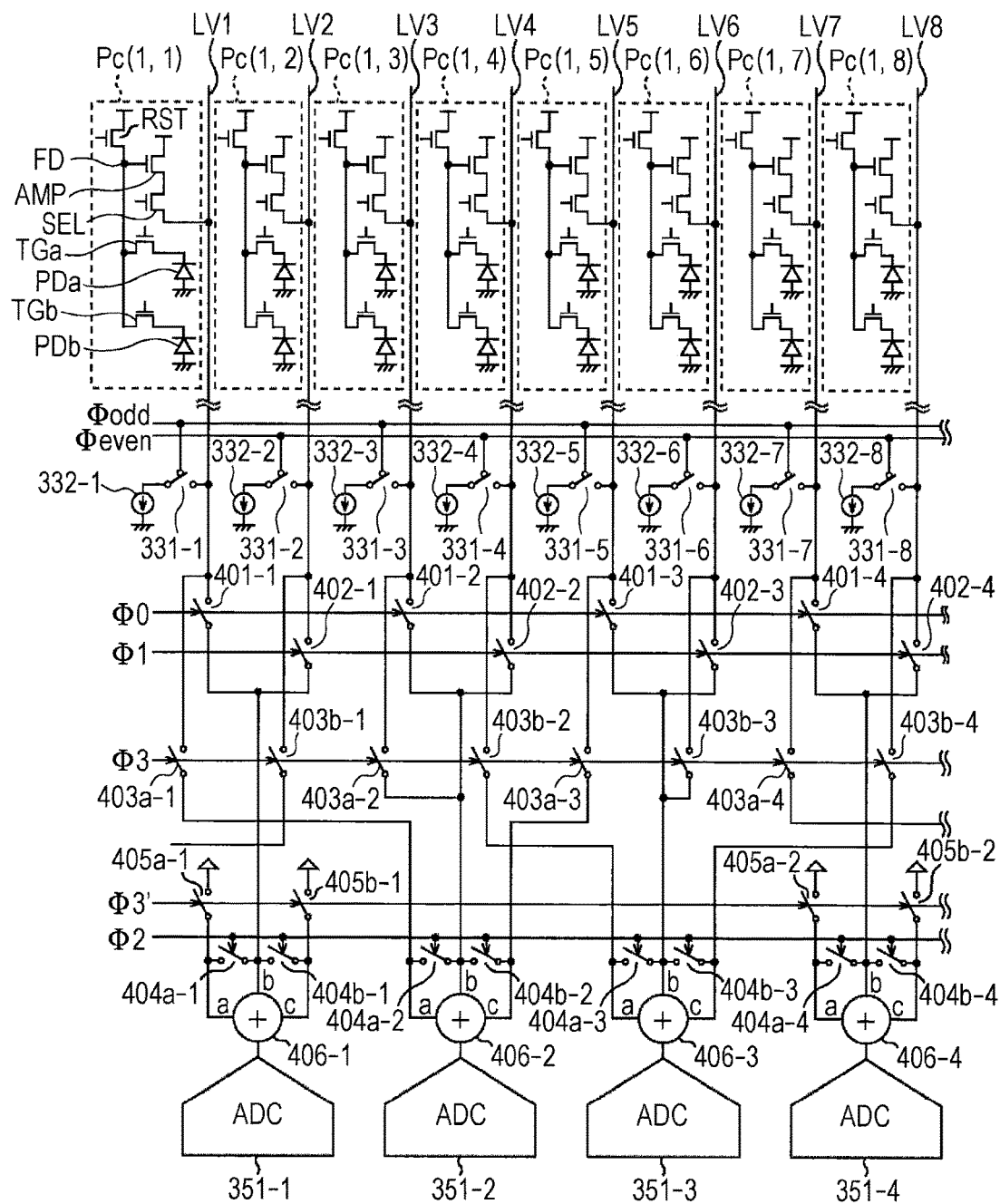
FIG. 11 is a circuit diagram illustrating an example of a configuration in which an input control section of the solid-state imaging device in FIG. 8 is more specified.

FIG. 11 illustrates a part of an example of a configuration of a CMOS image sensor 300 in which the input control section 313 in FIG. 8 is more specified. In this regard, in FIG. 11, a same symbol is given to a part corresponding to that in FIG. 8.

In this regard, in the example of the configuration, shared pixels Pc(1, 1) to Pc(r, n) having a different circuit configuration as those of the unit pixel Pa in FIG. 2 are disposed in the pixel array section 311. In the shared pixel Pc(1, 1) to Pc(r, n), a part of constituent elements are shared among pixels with two rows by two columns. Accordingly, if it is assumed that pixels with m rows and n columns are disposed in the pixel array section 311, it becomes that r=m/2.

In this regard, hereinafter if it is not necessary to distinguish the shared pixels Pc(1, 1) to Pc(r, n) separately, the shared pixels are referred to simply as a shared pixel Pc.

The shared pixel Pc includes photodiodes PDa and PDb, transfer transistors TGa and TGb, a reset transistor RST, an amplification transistor AMP, and a selection transistor SEL. And the photodiodes PDa and PDb, and the transfer transistors TGa and TGb are disposed for each pixel, and the reset transistor RST, the amplification transistor AMP, and the selection transistor SEL are shared among pixels with two rows by one column.

As described above, individual pixels are disposed in accordance with the Bayer arrangement in the pixel array section 311. Accordingly, for example, in a shared pixel Pc of an odd-numbered column, the photodiode PDa and the transfer transistor TGa are used for detecting an R component, and the photodiodes PDb and the transfer transistors TGb are used for detecting a G component. Also, for example, in a shared pixel Pc of an even-numbered column, the photodiode PDa and the transfer transistor TGa are used for detecting a G component, and the photodiode PDb and the transfer transistor TGb are used for detecting a B component.

Also, in the shared pixel Pc of the odd-numbered column, for example, the gate of the transfer transistor TGa is connected to the i-th transfer control line LTGA, and the gate of the transfer transistor TGb is connected to the (i+1)-th transfer control line LTGA.

Accordingly, when the transfer signal Φtga is given to the gate of the transfer transistor TGa through the i-th transfer control line LTGA, the transfer transistor TGa transfers the photoelectric charge produced by photoelectric conversion by the photodiode PDa to the floating diffusion FD. And the pixel signal in accordance with the photoelectric charge stored in the floating diffusion FD is output to the vertical signal line LV.

Also, when the transfer signal Φtga is given to the gate of the transfer transistor TGb through the (i+1)-th transfer control line LTGA, the transfer transistor TGb transfers the photoelectric charge produced by photoelectric conversion by the photodiode PDb to the floating diffusion FD. And the pixel signal in accordance with the photoelectric charge stored in the floating diffusion FD is output to the vertical signal line LV.

On the other hand, in the shared pixel Pc of the even-numbered column, for example, the gate of the transfer transistor TGa is connected to the i-th transfer control line LTGB, and the gate of the transfer transistor TGb is connected to the (i+1)-th transfer control line LTGB.

Accordingly, when the transfer signal Φtgb is given to the gate of the transfer transistor TGa through the i-th transfer control line LTGB, the transfer transistor TGa transfers the photoelectric charge produced by photoelectric conversion by the photodiode PDa to the floating diffusion FD. And the pixel signal in accordance with the photoelectric charge stored in the floating diffusion FD is output to the vertical signal line LV.

Also, when the transfer signal Φtga is given to the gate of the transfer transistor TGb through the (i+1)-th transfer control line LTGB, the transfer transistor TGb transfers the photoelectric charge produced by photoelectric conversion by the photodiode PDb to the floating diffusion FD. And the pixel signal in accordance with the photoelectric charge stored in the floating diffusion FD is output to the vertical signal line LV.

In this manner, in the shared pixel Pc, it is possible to separately read pixel signals based on photoelectric charges stored in the photodiodes PDa and PDb.

Also, in the example of the configuration, the input control section 313 includes switches 401-1 to 401-$n/2$, switches 402-1 to 402-$n/2$, switches 403a-1 to 403a-$n/2$, switches 403b-1 to 403b-$n/2$, switches 404a-1 to 404a-$n/2$, switches 404b-1 to 404b-$n/2$, switches 405a-1 to 405a-$n/6$, switches 405b-1 to 405b-$n/6$, and adder 406-1 to 406-$n/2$.

In this regard, a range to be one operation unit of the input control section 313 is illustrated in FIG. 11. In the following, a description will be given of a circuit configuration and operation of the input control section 313 in the range illustrated in FIG. 11.

The switch 401-1 is connected between the vertical signal line LV1 and the input terminal "b" of the adder 406-1. The switch 401-2 is connected between the vertical signal line LV3 and the input terminal "b" of the adder 406-2. The switch 401-3 is connected between the vertical signal line LV5 and the input terminal "b" of the adder 406-3. The switch 401-4 is connected between the vertical signal line LV7 and the input terminal "b" of the adder 406-4.

The switch 402-1 is connected between the vertical signal line LV2 and the input terminal "b" of the adder 406-1. The switch 402-2 is connected between the vertical signal line LV4 and the input terminal "b" of the adder 406-2. The switch 402-3 is connected between the vertical signal line LV6 and the input terminal "b" of the adder 406-3. The switch 402-4 is connected between the vertical signal line LV8 and the input terminal "b" of the adder 406-4.

The switch 403a-1 is connected between the vertical signal line LV1 and the input terminal "a" of the adder 406-2. The switch 403a-2 is connected between the vertical signal line LV3 and the input terminal "b" of the adder 406-2. The switch 403a-3 is connected between the vertical signal line LV5 and the input terminal "c" of the adder 406-2.

The switch 403b-2 is connected between the vertical signal line LV4 and the input terminal "a" of the adder 406-3. The switch 403b-3 is connected between the vertical signal line LV6 and the input terminal "b" of the adder 406-3. The switch 403b-4 is connected between the vertical signal line LV8 and the input terminal "c" of the adder 406-3.

The switch 404a-1 is connected between the input terminal "a" and the input terminal "b" of the adder 406-1. The switch 404b-1 is connected between the input terminal "b" and the input terminal "c" of the adder 406-1. The switch 404a-2 is connected between the input terminal "a" and the input terminal "b" of the adder 406-2. The switch 404b-2 is connected between the input terminal "b" and the input terminal "c" of the adder 406-2. The switch 404a-3 is connected between the input terminal "a" and the input terminal "b" of the adder 406-3. The switch 404b-3 is connected between the input terminal "b" and the input terminal "c" of the adder 406-3. The switch 404a-4 is connected between the input terminal "a" and the input terminal "b" of the adder 406-4. The switch 404b-4 is connected between the input terminal "b" and the input terminal "c" of the adder 406-4.

One end of the switch 405a-1 is connected to the input terminal "a" of the adder 406-1, and the other end is connected to ground. One end of the switch 405b-1 is connected to the input terminal "c" of the adder 406-1, and the other end is connected to ground. One end of the switch 405a-2 is connected to the input terminal "a" of the adder 406-4, and the other end is connected to ground. The switch 405b-2 is connected to the input terminal "c" of the adder 406-4, and the other end is connected to ground.

The switches 401-1 to 401-4 receive the control signal Φ0 supplied from the drive control section 316, and are turned on when the control signal Φ0 is the H level, and is turned off when the control signal Φ0 is the L level.

The switches 402-1 to 402-4 receive the control signal Φ1 supplied from the drive control section 316, and are turned on when the control signal Φ1 is the H level, and is turned off when the control signal Φ1 is the L level.

The switches 403a-1 to 403b-4 receive the control signal Φ3 supplied from the drive control section 316, and are turned on when the control signal Φ3 is the H level, and are turned off when the control signal Φ3 is the L level.

The switches 404a-1 to 404b-4 receive the control signal Φ2 supplied from the drive control section 316, and are turned on when the control signal Φ2 is the H level, and are turned off when the control signal Φ2 is the L level.

The switches 405a-1 to 405b-2 receive the control signal Φ3' supplied from the drive control section 316, and are turned on when the control signal Φ3' is the H level, and are turned off when the control signal Φ3' is the L level.

The adders 406-1 to 406-4 add signals that are input into the input terminals "a" to "c", and supplies the sum signal to the ADCs 351-1 to 351-4, respectively.

In this regard, the range in input control section 313 that is not illustrated in FIG. 11 has the same configuration as the range illustrated in FIG. 11.

2.4 Operation of Circuit in FIG. 11

Figure 12:
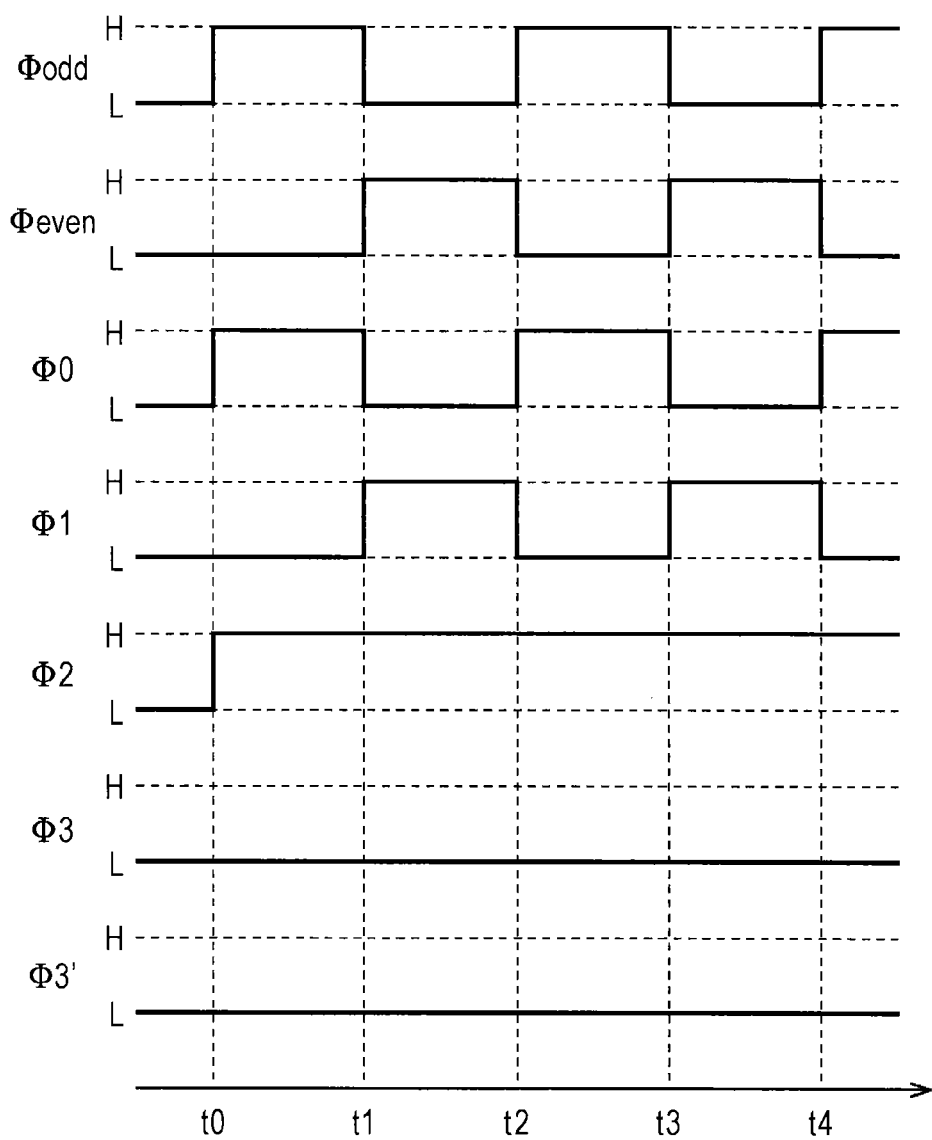
FIG. 12 is a timing chart for explaining operation at the time of high-resolution shooting mode of the circuit in FIG. 11.
Figure 13:
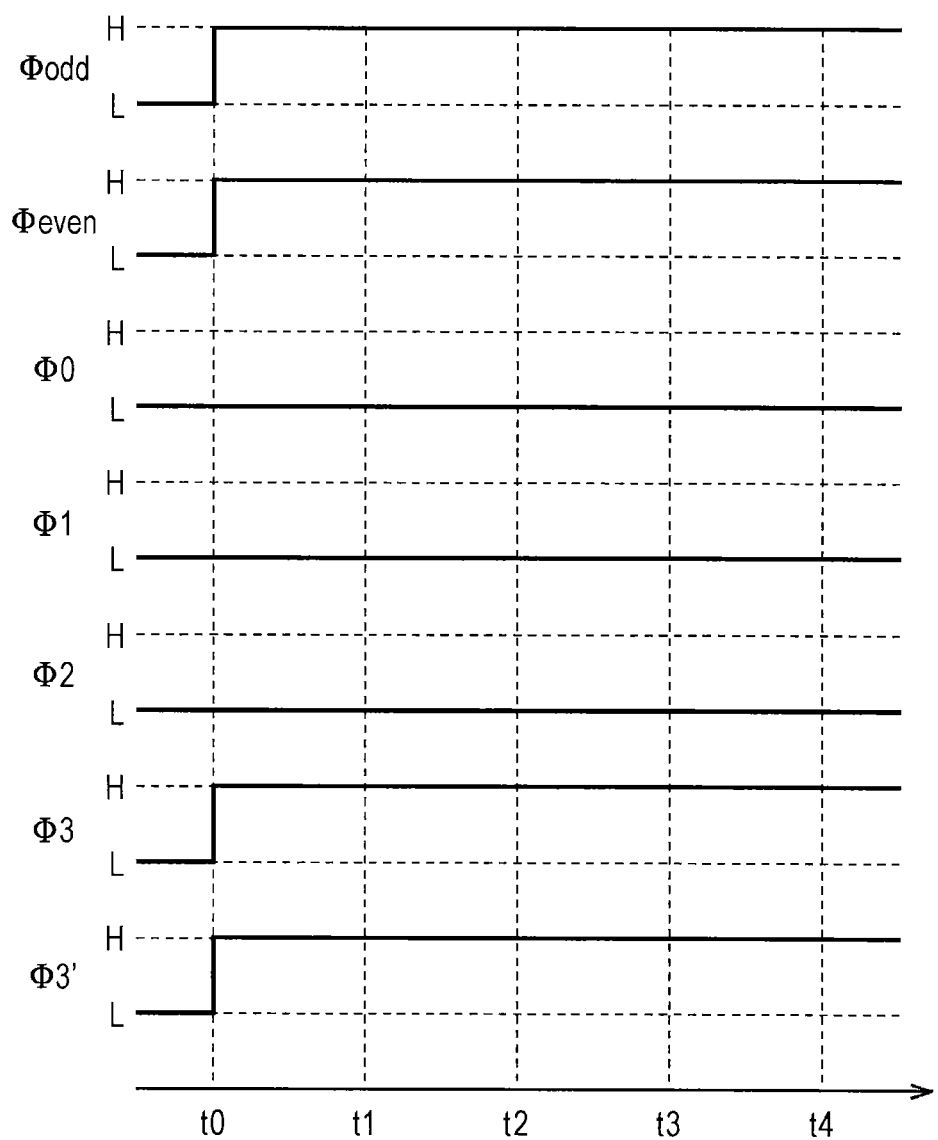
FIG. 13 is a timing chart for explaining operation at the time of high-quality shooting mode of the circuit in FIG. 11.

Next, a description will be given of operation of the circuit in FIG. 11 with reference to timing charts in FIG. 12 and FIG. 13.

First, a description will be given of operation of the circuit in FIG. 11 at the time of high-resolution shooting mode with reference to the timing chart in FIG. 12.

Before time t0 when shooting is started, the control signals Φodd to Φ3' are all set at the L level.

At time t0, the control signal Φodd is set to the H level. Thereby, the switches 331-1 and 331-3, the switch 331-5, and the switch 331-7 are turned on, and the bias current flows through the vertical signal line LV1, the vertical signal line LV3, the vertical signal line LV5, and the vertical signal line LV7. On the other hand, the bias current does not flow through the vertical signal line LV2, the vertical signal line LV4, the vertical signal line LV6, and the vertical signal line LV8.

Also, the control signals Φ0 and Φ2 are set to the H level. Thereby, the switches 401-1 to 401-4, and the switches 404a-1 to 404b-4 are turned on.

As a result, the pixel signal flowing through the vertical signal line LV1 is divided into three through the switch 401-1, and the switches 404a-1 and 404b-1, and are input into the adder 406-1 to be added. Accordingly, the pixel signal flowing through the vertical signal line LV1 is output from the adder 406-1 without change, and is input into the ADC 351-1.

Also, the pixel signal flowing through the vertical signal line LV3 is divided into three through the switch 401-2, the switches 404a-2 and 404b-2, and are input into the adder 406-2 to be added. Accordingly, the pixel signal flowing through the vertical signal line LV3 is output from the adder 406-2 without change, and is input into the ADC 351-2.

Further, the pixel signal flowing through the vertical signal line LV5 is divided into three through the switch 401-3, and the switches 404a-3 and 404b-3, and are input into the adder 406-3 to be added. Accordingly, the pixel signal flowing through the vertical signal line LV5 is output from the adder 406-3 without change, and is input into the ADC 351-3.

Also, the pixel signal flowing through the vertical signal line LV7 is divided into three through switch 401-4, and the switches 404a-4 and 404b-4, and are input into the adder 406-4 to be added. Accordingly, the pixel signal flowing through the vertical signal line LV7 is output from the adder 406-4 without change, and is input into the ADC 351-4.

And during a time period from time t0 to time t1, the pixel signals of odd-numbered columns (R columns) for one frame are read for each row under the control of the vertical drive section 315 and the horizontal drive section 317.

Next, at time t1, the control signal Φodd is set to the L level, and the control signal Φeven is set to the H level. Thereby, the switches 331-1, 331-3, switch 331-5, and the switch 331-7 are turned off, and the bias current does not flow through the vertical signal line LV1, the vertical signal line LV3, the vertical signal line LV5, and the vertical signal line LV7. On the other hand, the switches 331-2 and 331-4, the switch 331-6, and the switch 331-8 are turned on, and the bias current flows through the vertical signal line LV2, the vertical signal line LV4, the vertical signal line LV6, and the vertical signal line LV8.

Also, the control signal Φ0 is set to the L level, and the control signal Φ1 is set to the H level. Thereby, the switches 401-1 to 401-4 are turned off, and the switches 402-1 to 402-4 are turned on.

As a result, the pixel signal flowing through the vertical signal line LV2 is divided into three through the switch 402-1, and the switches 404a-1 and 404b-1, and are input into the adder 406-1 to be added. Accordingly, the pixel signal flowing through the vertical signal line LV2 is output from the adder 406-1 without change, and is input into the ADC 351-1.

Also, the pixel signal flowing through the vertical signal line LV4 is divided into three through the switch 402-2, the switches 404a-2 and 404b-2, and are input into the adder 406-2 to be added. Accordingly, the pixel signal flowing through the vertical signal line LV4 is output from the adder 406-2 without change, and is input into the ADC 351-2.

Further, the pixel signal flowing through the vertical signal line LV6 is divided into three through the switch 402-3, and the switches 404a-3 and 404b-3, and are input into the adder 406-3 to be added. Accordingly, the pixel signal flowing through the vertical signal line LV6 is output from the adder 406-3 without change, and is input into the ADC 351-3.

Also, the pixel signal flowing through the vertical signal line LV8 is divided into three through switch 402-4, and the switches 404a-4 and 404b-4, and are input into the adder 406-4 to be added. Accordingly, the pixel signal flowing through the vertical signal line LV8 is output from the adder 406-4 without change, and is input into the ADC 351-4.

And during a time period from time t1 to time t2, the pixel signals of even-numbered columns (B columns) for one frame are read for each row under the control of the vertical drive section 315 and the horizontal drive section 317.

Next, at time t2, the control signal Φeven and the control signal Φ1 are set to the L level, and the control signal Φodd and the control signal Φ0 are set to the H level. The result becomes the same state as the state at time t0.

And during a time period from time t2 to time t3, the pixel signals of the odd-numbered columns (R columns) for one frame are read for each row under the control of the vertical drive section 315 and the horizontal drive section 317.

Next, at time t3, the control signal Φodd and the control signal Φ0 are set to the L level, and the control signal Φeven and the control signal Φ1 are set to the H level. The result becomes the same state as the state at time t1.

And during a time period from time t3 to time t4, the pixel signals of the even-numbered columns (B columns) for one frame are read for each row under the control of the vertical drive section 315 and the horizontal drive section 317.

After that, the same operation is repeated.

In this manner, the pixel signals of the pixels of the odd-numbered column (R column) and the even-numbered column (B column) are alternately read. Thereby, it is possible to obtain a high-resolution image having the same resolution as the number of pixels disposed in the pixel array section 311.

Also, the bias current flows only through the vertical signal line LV of the pixel column that is read, and the bias current does not flow through the vertical signal line LV of the pixel column that is not read. Thereby, it is possible to reduce power consumption of the CMOS image sensor 300.

Next, a description will be given of operation of the circuit in FIG. 11 at the time of high-quality shooting mode with reference to a timing chart in FIG. 13.

Before time t0 when shooting is started, the control signals Φodd to Φ3' are all set at the L level.

At time t0, the control signal Φodd and the control signal Φeven are set to the H level. Thereby, the switches 331-1 to 331-8 are turned on, and the bias current flows through the vertical signal lines LV1 to LV8.

Also, the control signal Φ3 is set to the H level. Thereby, the switches 403a-1 to 403b-4 are turned on.

As a result, the pixel signal that flows through the vertical signal line LV1 is input into the input terminal "a" of the adder 406-2 through the switch 403a-1. The pixel signal that flows through the vertical signal line LV3 is input into the input terminal "b" of the adder 406-2 through the switch 403a-2. The pixel signal that flows through the vertical signal line LV5 is input into the input terminal "c" of the adder 406-2 through the switch 403a-3. Thereby, the adder 406-2 outputs a smoothed pixel signal that has been produced by adding pixel signals flowing through the vertical signal lines LV1, LV3, and LV5, and the produced pixel signal is input into the ADC 351-2. That is to say, a smoothed pixel signal that has been subjected to smoothing by adding pixel signals of the three odd-numbered columns is input into the ADC 351-2.

Also, the pixel signal that flows through the vertical signal line LV4 is input into the input terminal "a" of the adder 406-3 through the switch 403b-2. The pixel signal that flows through the vertical signal line LV6 is input into the input terminal "b" of the adder 406-3 through the switch 403b-3. The pixel signal that flows through the vertical signal line LV8 is input into the input terminal "c" of the adder 406-3 through the switch 403a-4. Thereby, the adder 406-3 outputs a pixel signal produced by adding the pixel signals that flow the vertical signal line LV4, LV6, and LV8, and the sum pixel signal is input into the ADC 351-3. That is to say, a smoothed pixel signal that has been subjected to smoothing by adding pixel signals of the three even-numbered columns is input into the ADC 351-3.

And a smoothed pixel signal produced by adding the pixel signals for three odd-numbered columns (R columns) and a smoothed pixel signal produced by adding the pixel signals for three even-numbered columns (B columns) are read for each row in parallel under the control of the vertical drive section 315 and the horizontal drive section 317.

Thereby, it is possible to obtain the high-quality image having lower resolution than the high-resolution shooting mode, but less noise by the smoothing. Also, the pixel signals of the R columns and the B columns are read at the same time, and thus it becomes possible to shoot at a higher speed than in the high-resolution shooting mode.

Further, the control signal Φ3' is set to the H level. Thereby, the switches 405a-1 to 405b-2 are turned on. Thereby, the input terminals "a" and the input terminals "c" of the adder 406-1 and the adder 406-4, which are not used at the time of high-quality shooting mode, are grounded.

Accordingly, it is possible to prevent instability of the input voltage to the adder 406-1 and the adder 406-4 and the occurrence of malfunction and so on. Also, no signals are input into the input terminals "b" of the adder 406-1 and the adder 406-4, and thus the adder 406-1 and the adder 406-4 do not supply signals to the ADC 351-1 and the ADC 351-4. Thereby, it is possible to stop operation of the ADC 351-1 and the ADC 351-4, and to reduce power consumption.

3. Variations

It is possible to apply the present technique to the case where there are pixel columns whose pixel signals are read and pixel columns whose pixel signals are not read in addition to the above-described cases. For example, as in the above-described high-quality shooting mode, in a mode of smoothing pixel signals of a plurality of pixel columns, in the case where there are pixel columns whose pixel signals are not read, it is possible not to allow a bias current to flow through the vertical signal lines corresponding to the pixel columns.

Also, in the above description, an ADC is shared by every two pixel columns, and pixel columns whose pixel signals are read are changed for every two columns in time series. However, it is possible to apply the present technique to the case where an ADC is shared by every three pixel columns or more, and pixel columns whose pixel signals are read are changed for every three columns or more in time series.

Further, in the above description, an example in which pixel signals are smoothed for every three columns is given. However, it is possible to apply the present technique to the case where pixel signals are smoothed for every two pixel columns or more.

Figure 14:
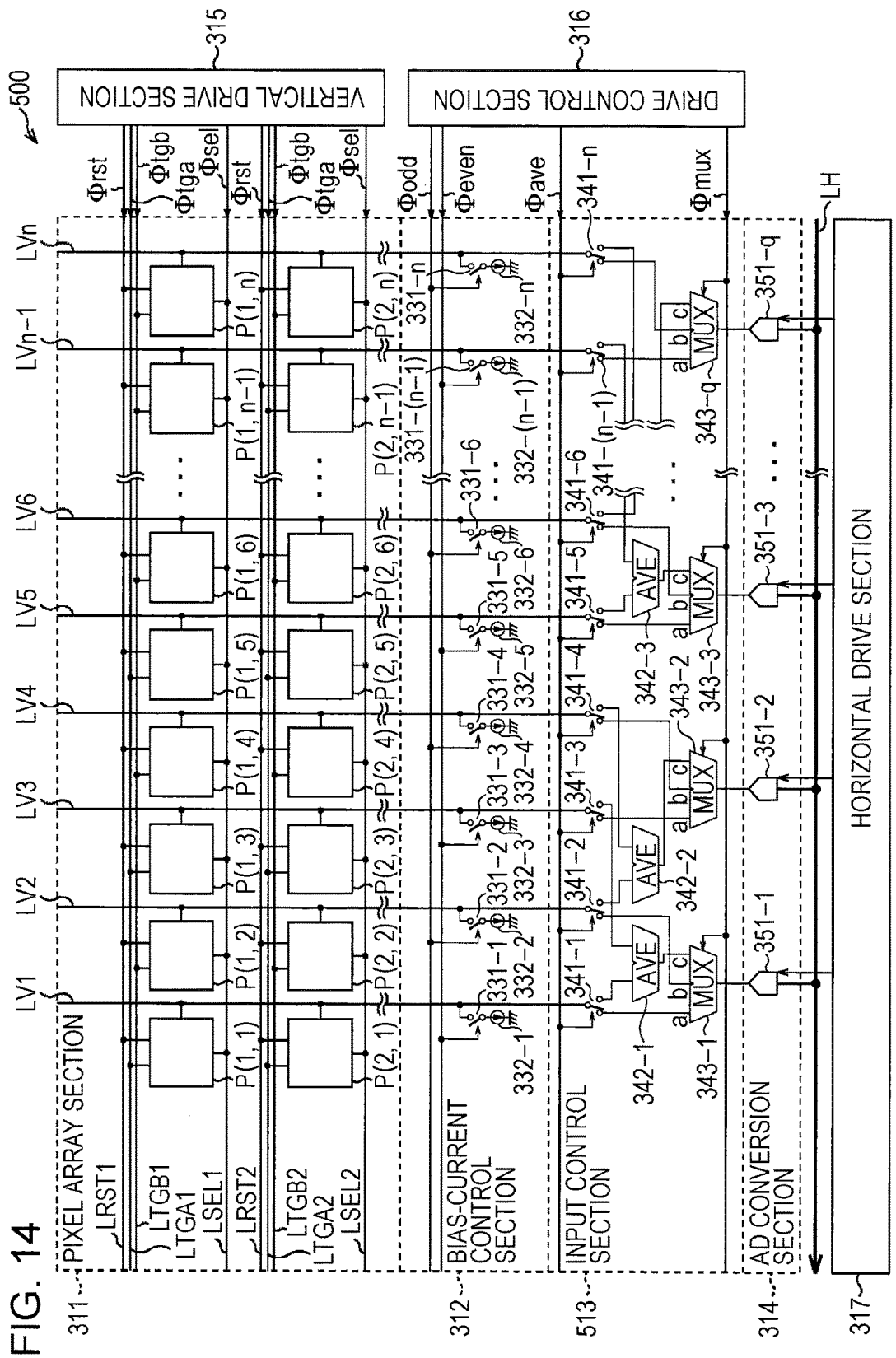
FIG. 14 is a schematic diagram illustrating a variation of a basic system configuration of the solid-state imaging device to which the present technique is applied.

FIG. 14 is a system configuration diagram illustrating a schematic configuration of a CMOS image sensor 500 that is changed in order to perform smoothing pixel signals for every two columns. In this regard, in FIG. 14, the same symbol is given to a part corresponding to the same part in FIG. 8.

A comparison of the CMOS image sensor 500 with the CMOS image sensor 300 in FIG. 8 indicates a difference that an input control section 513 is disposed in place of the input control section 313. Also, the number of averaging circuits 342 and a wiring method are different in the input control section 513 as compared with the input control section 313.

For example, the averaging circuit 342-1 supplies a smoothed pixel signal indicating the average of the pixel signals supplied from the vertical signal line LV1 and the vertical signal line LV3 to the multiplexer 343-1. That is to say, the smoothed pixel signal supplied to the multiplexer 343-1 indicates the average of the pixel signals of two R columns. Also, the averaging circuit 342-2 supplies a smoothed pixel signal indicating the average of the pixel signals supplied from the vertical signal line LV2 and the vertical signal line LV4 to the multiplexer 343-2. That is to say, the smoothed pixel signal supplied to the multiplexer 343-2 indicates the average of the pixel signals of two B columns.

Accordingly, in the CMOS image sensor 500, it is possible to smooth pixel signals for every two columns at the time of high-quality shooting mode.

Also, it is possible to apply the present technique to the case where pixel columns whose pixel signals are read are changed in time series even if the solid-state imaging device is provided with an ADC for each pixel column.

Further, it is possible to apply the present technique to the case where an ADC is disposed for each one or a plurality of pixel columns, and there is an ADC that is not used in a certain operation mode. In the above-described example, an example has been given where the number of ADCs used is smaller in the high-quality shooting mode than in the high-resolution shooting mode, and thus the ADCs that are not used in the high-quality shooting mode are controlled to be stopped. However, depending on the number of pixel columns whose pixel signals are changed in time series, and the number of pixel columns whose pixel signals are smoothed, it is assumed that there are cases where the number of ADCs to be used is smaller in the high-resolution shooting mode than in the high-quality shooting mode. In that case, in the high-resolution shooting mode, operations of the ADCs that are not used ought to be controlled to be stopped.

Also, in the above-described embodiments, a description has been given of the case where the present technique is applied to a CMOS image sensor as an example. However, the present technique is not limited to an application to a CMOS image sensor. That is to say, it is possible to apply the present technique to all the cases of a solid-state imaging device including an amplification transistor for each unit pixel or for each shared pixel.

Also, the present technique is not limited to an application to a solid-state imaging device that detects a distribution of the amount of visible incident light to capture an image. It is possible to apply the present technique to all the solid-state imaging devices that capture a distribution of the amount of incident infrared light, X-rays, or particles, and so on, as an image.

In this regard, a solid-state imaging device may be formed as one chip, or a shooting section and a signal processing section or an optical system may be packaged into a module having a shooting function.

Also, each switch of the above-described circuits is configured by various kinds of transistors, for example, a MOSFET, and so on.

4. Electronic Systems

The present technique is not limited to be applied to a solid-state imaging device. It is possible to apply the present technique to an electronic system in general, which uses a solid-state imaging device in an image capturing section (photoelectric conversion section), such as an imaging apparatus, for example, a digital still camera, a video camera, and so on, a mobile terminal having an imaging function, for example, a mobile phone, and so on, and a copying machine using a solid-state imaging device in an image capturing section, and so on. In this regard, the above-described module that is mounted in an electronic system, that is to say, a camera module, may be assumed to be an imaging apparatus.

Figure 15:
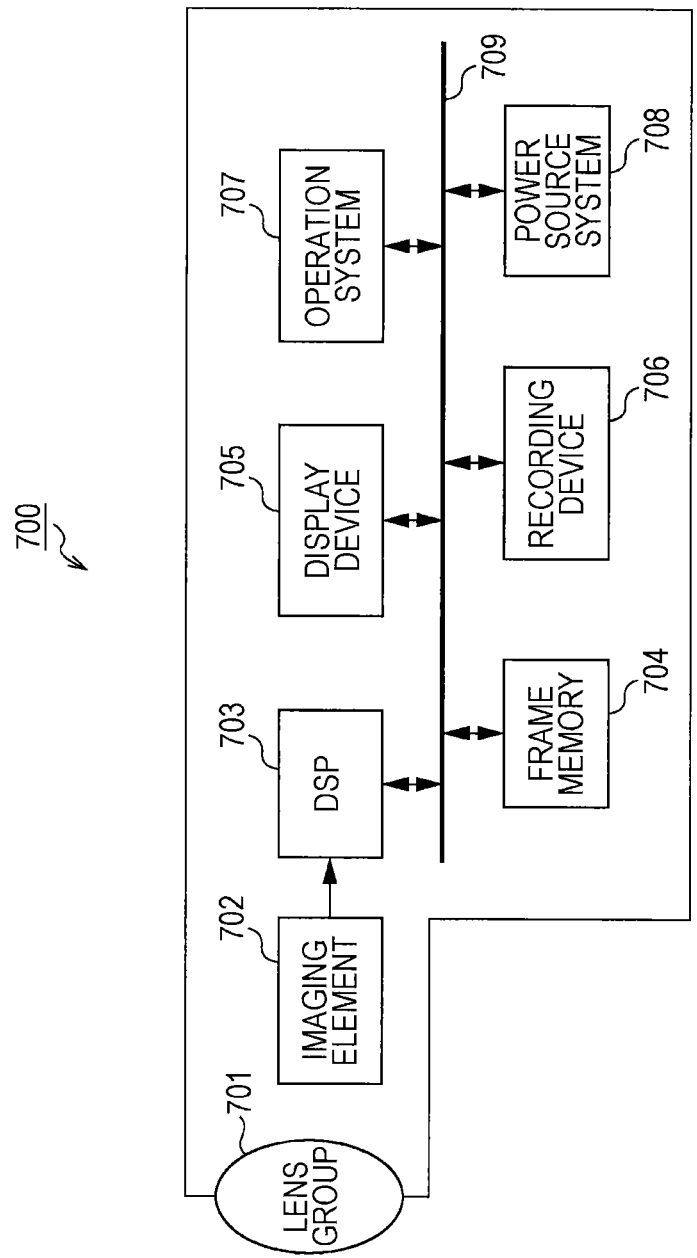
FIG. 15 is a block diagram illustrating an example of a configuration of an electronic system, for example, an imaging apparatus, according to the present technique.

FIG. 15 is a block diagram illustrating an example of a configuration of an electronic system, for example, an imaging apparatus, according to the present technique.

As illustrated in FIG. 15, an imaging apparatus 700 according to the present technique includes an optical system including a lens group 701 and so on, an imaging element (imaging device) 702, a DSP circuit 703, a frame memory 704, a display device 705, a recording device 706, an operation system 707, a power source system 708, and so on. And the DSP circuit 703, the frame memory 704, the display device 705, the recording device 706, the operation system 707, and the power source system 708 are mutually connected through a bus line 709.

The lens group 701 takes in incident light (image light) from a subject, and forms an image on an imaging surface of the imaging element 702. The imaging element 702 converts the amount of the incident light formed on the imaging surface by the lens group 701 for each pixel into an electronic signal, and outputs the electronic signal as a pixel signal.

The display device 705 includes a panel-type display device, such as a liquid crystal display device, an organic EL (electro-luminescence) display device, and so on, and displays a moving image or a still image captured by the imaging element 702. The recording device 706 records the moving image or the still image captured by the imaging element 702 on a recording medium, such as a video tape, a DVD (Digital Versatile Disk), and so on.

The operation system 707 issues an operation command on various functions held by this imaging apparatus by the operation of a user. The power source system 708 suitably supplies various kinds of power sources to be operation power sources to the DSP circuit 703, the frame memory 704, the display device 705, the recording device 706, and the operation system 707.

It is possible to use an imaging apparatus having the above-described configuration as an imaging apparatus, such as a video camera, a digital still camera, further, as a camera module for mobile apparatuses, for example, a mobile phone, and so on. And in the imaging apparatus, it becomes possible to reduce power consumption as described above using as a solid-state imaging device, such as the CMOS image sensor 300 or the CMOS image sensor 500, and so on, according to the above-described embodiments, as the imaging element 702.

Also, it is possible to configure the present technique as follows, for example.

(1) A solid-state imaging device including:
a pixel array section in which a plurality of pixels including an amplification transistor configured to amplify a signal based on a photoelectric charge in accordance with an amount of received light are disposed;
through vertical signal lines of the pixel array section, a bias-current control section configured to turn on or off a bias current supplied to the amplification transistor for each of the vertical signal lines; and
a drive control section configured to control the bias-current control section so as to turn on the bias current of the vertical signal line through which a pixel signal is read, and to turn off the bias current of the vertical signal line through which a pixel signal is not read.

(2) The solid-state imaging device according to (1),
wherein the drive control section is configured to further control switching modes between a first mode in which pixel columns whose pixel signals are read are changed in time series, and a second mode in which pixel signals of all the pixel columns are read and then the pixel signals of the plurality of pixel columns are smoothed.

(3) The solid-state imaging device according to (2),
wherein in the first mode, the drive control section is configured to perform control so as to turn on the bias current of the vertical signal line through which a pixel signal is read, and to turn off the bias current of the vertical signal line through which a pixel signal is not read.

(4) The solid-state imaging device according to (2), further including an AD converter disposed in every two or more pixel columns of the pixel array section,
wherein if a number of the AD converters to be used is different between in the first mode and in the second mode, the drive control section is configured to perform control to stop operation of the AD converter not to be used in a mode of a smaller number of the AD converters to be used.

(5) A method of driving a solid-state imaging device including a pixel array section in which a plurality of pixels including an amplification transistor configured to amplify a signal based on a photoelectric charge in accordance with an amount of received light are disposed, the method including:
out of bias currents supplied to the amplification transistors through vertical signal lines of the pixel array section, turning on the bias current of the vertical signal line through which a pixel signal is read, and turning off the bias current of the vertical signal line through which a pixel signal is not read.

(6) An electronic system including:
a solid-state imaging device including
a pixel array section in which a plurality of pixels including an amplification transistor configured to amplify a signal based on a photoelectric charge in accordance with an amount of received light are disposed,
through vertical signal lines of the pixel array section, a bias-current control section configured to turn on or off a bias current supplied to the amplification transistor for each of the vertical signal lines, and
a drive control section configured to control the bias-current control section so as to turn on the bias current of the vertical signal line through which a pixel signal is read, and to turn off the bias current of the vertical signal line through which a pixel signal is not read; and
a signal processing section configured to perform signal processing on the pixel signals output from the pixels.

The present disclosure contains subject matter related to that disclosed in Japanese Priority Patent Application JP 2012-113276 filed in the Japan Patent Office on May 17, 2012, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A solid-state imaging device comprising:
a plurality of pixels that respectively include a photo electric converter that converts incident light into a signal and an amplification transistor that amplifies the signal;
a plurality of vertical signal lines that respectively receive amplified signals from the pixels;
bias-current control circuitry configured to turn on or off a bias current supplied to the amplification transistor;
an averaging circuit configured to average the amplified signals from the plurality of vertical signal lines;
a plurality of analog to digital converters; and
drive control circuitry configured to control the bias-current control circuitry and the analog to digital converters in a first mode and a second mode, wherein in the first mode the drive control circuitry is configured to provide a stop operation to at least one of the analog to digital converters, such that fewer of the analog to digital converters are operational in the first mode as compared to the second mode.

2. The solid-state imaging device according to claim 1, wherein in the first mode, the drive control circuitry is configured to control the bias-current control circuitry by turning on the bias current of a respective one of the vertical signal lines through which a pixel signal is read, and by turning off the bias current of other vertical signal lines through which the pixel signal is not read.

3. The solid-state imaging device according to claim 1, wherein the first mode is a high-quality shooting mode and the second mode is a high-resolution shooting mode.

4. The solid-state imaging device according to claim 2, wherein the first mode is a high-quality shooting mode and the second mode is a high-resolution shooting mode.

5. An electronic system comprising:
a solid-state imaging device including
a plurality of pixels that respectively include a photo electric converter that converts incident light into a signal and an amplification transistor that amplifies the signal;

a plurality of vertical signal lines that respectively receive amplified signals from the pixels;

bias-current control circuitry configured to turn on or off a bias current supplied to the amplification transistor;

an averaging circuit configured to average the amplified signals from the plurality of vertical signal lines; and a plurality of analog to digital converters; and drive control circuitry configured to control the bias-current control circuitry and the analog to digital converters in a first mode and a second mode, wherein in the first mode the drive control circuitry is configured to provide a stop operation to at least one of the analog to digital converters, such that fewer of the analog to digital converters are operational in the first mode as compared to the second mode.

6. The electronic system according to claim 5, wherein in the first mode, the drive control circuitry is configured to control the bias-current control circuitry by turning on the bias current of a respective one of the vertical signal lines through which a pixel signal is read, and by turning off the bias current of other vertical signal lines through which the pixel signal is not read.

7. The electronic system according to claim 5, wherein the first mode is a high-quality shooting mode and the second mode is a high-resolution shooting mode.

8. The electronic system according to claim 6, wherein the first mode is a high-quality shooting mode and the second mode is a high-resolution shooting mode.

9. A method of driving a solid-state imaging device including a plurality of pixels respectively having a photo electric converter that converts incident light into a signal and an amplification transistor that amplifies the signal, and a plurality of analog to digital converters, the method comprising:

receiving, by a plurality of vertical signal lines, amplified signals from the pixels;

turning on or turning off, by a bias-current control circuitry, a bias current supplied to the amplification transistor;

averaging, by an averaging circuit, amplified signals from the plurality of vertical signal lines; and controlling, by drive control circuitry, the bias-current control circuitry and the analog to digital converters in a first mode and a second mode, wherein in the first mode the drive control circuitry is configured to provide a stop operation to at least one of the analog to digital converters, such that fewer of the analog to digital converters are operational in the first mode as compared to the second mode.

10. The method according to claim 9, further comprising:

controlling the bias-current control circuitry in the first mode by turning on the bias current of a respective one of the vertical signal lines through which a pixel signal is read, and by turning off the bias current of other vertical signal lines through which the pixel signal is not read.

11. The method according to claim 9, wherein the first mode is a high-quality shooting mode and the second mode is a high-resolution shooting mode.

12. The method according to claim 10, wherein the first mode is a high-quality shooting mode and the second mode is a high-resolution shooting mode.

* * * * *